United States Patent
Arimura et al.

(10) Patent No.: US 8,650,969 B2
(45) Date of Patent: Feb. 18, 2014

(54) MAGNETOSTRICTIVE TORQUE SENSOR AND ELECTRICALLY-ASSISTED POWER STEERING APPARATUS

(75) Inventors: Yutaka Arimura, Wako (JP); Yasuo Shimizu, Wako (JP); Takeshi Wakabayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 150 days.

(21) Appl. No.: 13/301,789

(22) Filed: Nov. 22, 2011

(65) Prior Publication Data

US 2012/0137789 A1 Jun. 7, 2012

(30) Foreign Application Priority Data

Dec. 6, 2010 (JP) ................. 2010-271011

(51) Int. Cl.
*G01L 3/00* (2006.01)
*G01L 3/14* (2006.01)

(52) U.S. Cl.
USPC ............ 73/862.333; 73/862.321; 73/862.325; 73/862.231

(58) Field of Classification Search
USPC ........ 73/862.331–862.336, 862.321, 862.325
See application file for complete search history.

(56) References Cited

U.S. PATENT DOCUMENTS

| | | | | |
|---|---|---|---|---|
| 4,823,617 A | * | 4/1989 | Hase et al. ............... | 73/862.335 |
| 5,442,966 A | * | 8/1995 | Hase et al. ............... | 73/862.335 |
| 7,478,568 B2 | * | 1/2009 | Yoneda et al. ........... | 73/862.333 |
| 7,497,132 B2 | * | 3/2009 | Harata et al. ............. | 73/862.335 |
| 7,677,115 B2 | * | 3/2010 | Fukuda et al. ........... | 73/862.335 |
| 7,752,921 B2 | * | 7/2010 | Yoneda et al. ........... | 73/862.333 |
| 8,011,256 B2 | * | 9/2011 | Yoneda et al. ........... | 73/862.335 |
| 8,181,538 B2 | * | 5/2012 | Yamamura et al. ...... | 73/862.335 |
| 2007/0074589 A1 | * | 4/2007 | Harata et al. ............. | 73/862.335 |
| 2007/0193372 A1 | * | 8/2007 | Shimizu ................... | 73/862.335 |
| 2007/0283767 A1 | * | 12/2007 | Watanabe et al. ........ | 73/862.331 |
| 2010/0263457 A1 | * | 10/2010 | Yoneda et al. ........... | 73/862.335 |

FOREIGN PATENT DOCUMENTS

JP 2004-245636 9/2004
JP 2008-216162 9/2008

* cited by examiner

*Primary Examiner* — Lisa Caputo
*Assistant Examiner* — Jonathan Dunlap
(74) *Attorney, Agent, or Firm* — Ditthavong Mori & Steiner, P.C.

(57) ABSTRACT

A magnetostrictive torque sensor includes a rotation shaft, a magnetostrictive member, and a plurality of detectors. The rotation shaft is rotationally supported. The magnetostrictive member is disposed on a surface of the rotation shaft and being deformable in accordance with a magnitude of rotation torque applied to the rotation shaft to change magnetic permeability. The plurality of detectors are disposed on a periphery of the rotation shaft. Each of the detectors is configured to detect a change in magnetic permeability of the magnetostrictive member in a form of an electrical change. The detectors are configured to detect different amounts of electrical change from one another if amounts of change in deformation are same throughout the magnetostrictive member.

9 Claims, 12 Drawing Sheets

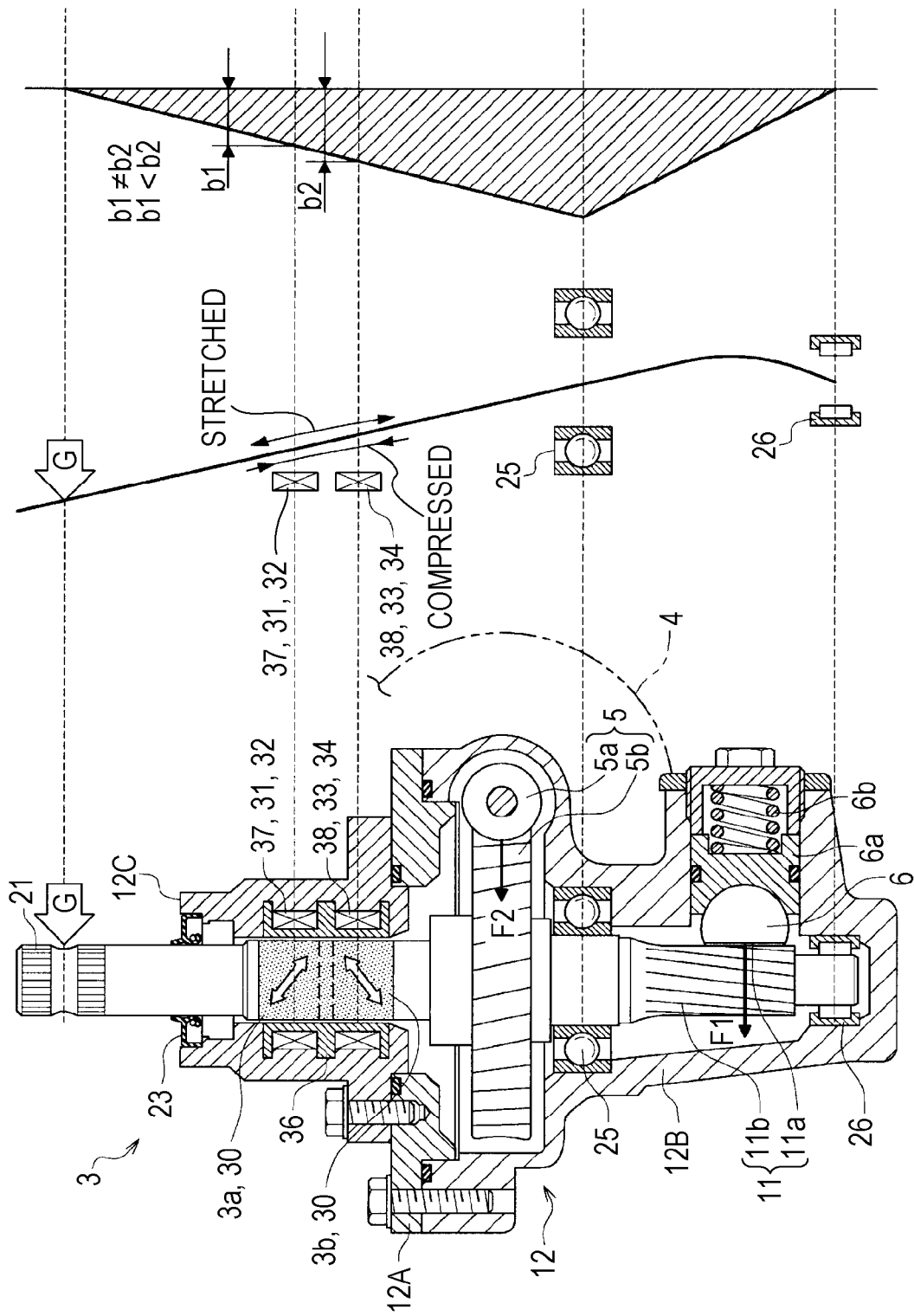

MAGNETOSTRICTIVE TORQUE SENSOR AND ELECTRICALLY-ASSISTED POWER STEERING APPARATUS

CROSS-REFERENCE TO RELATED APPLICATIONS

The present application claims priority under 35 U.S.C. §119 to Japanese Patent Application No. 2010-271011, filed Dec. 6, 2010, entitled "Magnetostrictive Torque Sensor and Electrically-Assisted Power Steering Apparatus." The contents of this application are incorporated herein by reference in their entirety.

BACKGROUND OF THE INVENTION

1. Field of the Invention

The present invention relates to a magnetostrictive torque sensor and an electrically-assisted power steering apparatus.

2. Discussion of the Background

A magnetostrictive torque sensor is provided in the electrically-assisted power steering apparatus for a motor vehicle. The electrically-assisted power steering apparatus is a support apparatus for assisting a steering force using a motor that operates together with a steering wheel when a driver drives a motor vehicle and operates the steering wheel. In the electrically-assisted power steering apparatus, the magnetostrictive torque sensor detects a steering torque induced on a rotation shaft (a steering axle) coupled to a steering wheel through a steering operation performed by the driver. The electrically-assisted power steering apparatus controls an assisting steering force output from a motor on the basis of at least the detected steering torque and a vehicle speed signal output from a vehicle speed sensor that detects the speed of the motor vehicle so as to reduce the steering force exerted by the driver.

A magnetostrictive torque sensor having upper and lower magnetostrictive members disposed on a surface of the rotation shaft so that the upper and lower magnetostrictive members have magnetic anisotropy in the opposite directions has been developed (refer to, for example, Japanese Unexamined Patent Application Publication No. 2004-245636). If a steering torque is applied to the rotation shaft, a rotational moment is induced and the rotation shaft is twisted. Accordingly, the two magnetostrictive members deform. At that time, by the inverse magnetostriction effect due to the magnetic anisotropy, deformation of one of the magnetostrictive members is further increased and deformation of the other magnetostrictive member is decreased. The increase/decrease in deformation changes, for example, the impedances of detection circuits disposed on the peripheries of the two magnetostrictive members. By detecting the changes, the magnetostrictive torque sensor can detect the steering torque applied to the rotation shaft.

However, if the assisting steering force output from a motor is transferred to the rotation shaft via gears, a bending moment that acts to bend the central axis of the rotation shaft is applied to the rotation shaft in addition to the rotational moment about the shaft. The magnitude of the bending moment varies in accordance with the position in the axis direction of the rotation shaft. More specifically, the magnitude of the bending moment is 0 (zero) at the point of application of the bending moment, and the magnitude increases with distance from the point of application of the bending moment. Accordingly, bending moments having different magnitudes act on the two magnetostrictive members formed at different locations. Since each of the two magnetostrictive members detects the rotational moment and the bending moment as the same deformation, detection accuracy of the magnetostrictive torque sensor for detecting the rotational moment decreases. This is because bending moments having different magnitudes act on the two magnetostrictive members and, therefore, even when the difference between the outputs (e.g., the impedances) of the detection circuits corresponding to the magnetostrictive members is obtained, the outputs for the bending moments cannot be canceled out. Accordingly, in order to cancel out the outputs for the bending moments, a technique for setting the geometric moments of inertia at the points at which the two magnetostrictive members are disposed to different values has been developed (refer to, for example, Japanese Unexamined Patent Application Publication No. 2008-216162).

SUMMARY OF THE INVENTION

According to one aspect of the present invention, a magnetostrictive torque sensor comprises a rotation shaft, a magnetostrictive member, and a plurality of detectors. The rotation shaft is rotationally supported. The magnetostrictive member is disposed on a surface of the rotation shaft and being deformable in accordance with a magnitude of rotation torque applied to the rotation shaft to change magnetic permeability. The plurality of detectors are disposed on a periphery of the rotation shaft. Each of the detectors is configured to detect a change in magnetic permeability of the magnetostrictive member in a form of an electrical change. The detectors are configured to detect different amounts of electrical change from one another if amounts of change in deformation are same throughout the magnetostrictive member.

According to another aspect of the present invention, an electrically-assisted power steering apparatus comprises the magnetostrictive torque sensor, a rack and pinion gear mechanism, and a bearing. The rotation shaft serves as a steering axle. The rack and pinion gear mechanism is to transfer rotation of the steering axle. The bearing is disposed between the detector and the rack and pinion gear mechanism. The bearing rotatably supports the steering axle. The detectors are disposed to be shifted from each other in an axis direction of the rotation shaft. The at least two detectors includes a first detector and a second detector. The second detector is disposed nearer to the bearing than the first detector. If amounts of change in deformation are the same throughout the magnetostrictive member, the second detector detects an electrical change that is smaller than an electrical change detected by the first detector.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 12A illustrates an exemplary configuration of a magnetostrictive torque sensor; FIG. 12B is a schematic illustration of the bentness of the central axis of a rotation shaft; and FIG. 12C is a bending moment diagram illustrating the magnitude of the bending moment along the rotation shaft for a magnetostrictive torque sensor (having one end that is open and the other end that is fixed) according to an eighth exemplary embodiment of the present invention.

DESCRIPTION OF THE EMBODIMENTS

Figure 1:
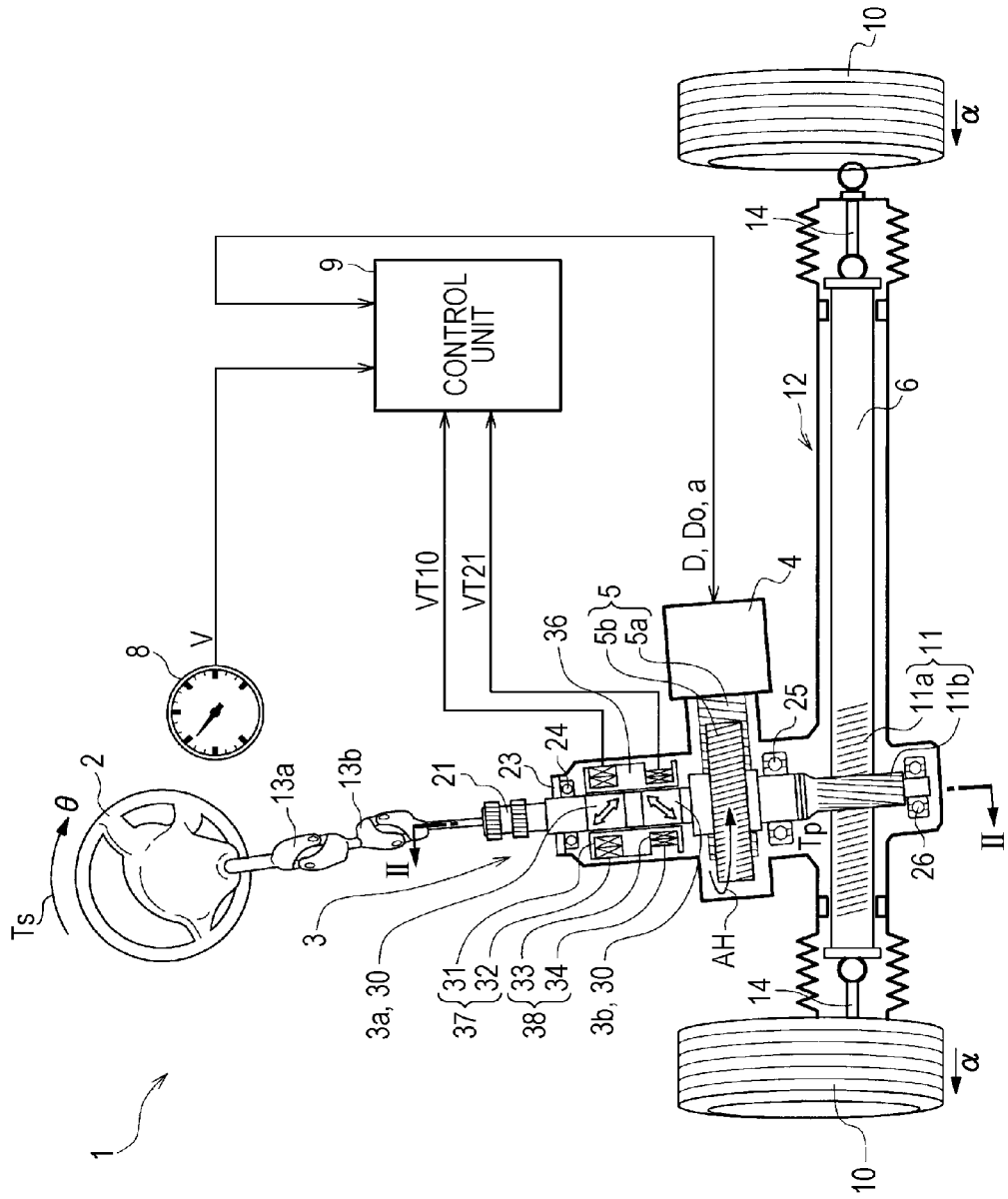
FIG. 1 illustrates an exemplary configuration of an electrically-assisted power steering apparatus according to a first exemplary embodiment of the present invention.

The embodiments will now be described with reference to the accompanying drawings, wherein like reference numerals designate corresponding or identical elements throughout the various drawings.

Exemplary embodiments of the present invention are described in detail below with reference to the accompanying drawings. Note that the same reference numerals are used in the drawings to identify the same elements and blocks, and the descriptions are not repeated.

First Exemplary Embodiment

FIG. 1 illustrates an exemplary configuration of an electrically-assisted power steering apparatus 1 according to a first exemplary embodiment of the present invention. When a driver rotationally operates a steering wheel 2, the electrically-assisted power steering apparatus 1 applies an assisting torque $A_H$ to a rotation shaft (a steering axle) 21 coupled to the steering wheel 2 and, thus, reduces the steering force exerted by the driver. The electrically-assisted power steering apparatus 1 includes a magnetostrictive torque sensor 3 that detects the magnitude and direction of rotation torque (steering torque) Ts applied to the rotation shaft (a steering axle) 21 when the driver rotationally operates the steering wheel 2, an electric motor 4 that generates the assisting torque $A_H$, a reduction mechanism that magnifies the assisting torque $A_H$ generated by the electric motor 4 and transfers the magnified assisting torque $A_H$ to the rotation shaft (the steering axle) 21, and a control unit 9 that controls the electric motor 4 to generate the assisting torque $A_H$ having a magnitude in accordance with the result of detection performed by the magnetostrictive torque sensor 3.

The steering wheel 2 is coupled to the upper end of the rotation shaft (the steering axle) 21 via universal joints 13a and 13b. A pinion gear 11b is coupled to the lower end of the rotation shaft (the steering axle) 21. The pinion gear 11b is engaged with a rack gear 11a. The rack gear 11a and the pinion gear 11b form a rack and pinion gear mechanism 11. The rack and pinion gear mechanism 11 converts the steering torque Ts of the rotation shaft (the steering axle) 21 into a thrust force (pinion torque Tp) in the axis direction of a rack shaft 6. The rack gear 11a is formed in the rack shaft 6 by grooving the rack shaft 6. The rack shaft 6 is supported in a steering gear box 12 so as to freely move in the axis direction without rotating. One end of each of two tie rods 14 is fixed to one of the ends of the rack shaft 6. The other end of the tie rod 14 has a front wheel (a wheel) 10 of the motor vehicle attached thereto. According to such a configuration, the right and left wheels 10 can be steered by the driver rotationally operating the steering wheel 2.

A seal 23 that seals between the rotation shaft (the steering axle) 21 and the steering gear box 12 is provided on the upper section of the rotation shaft (the steering axle) 21. In addition, the rotation shaft (the steering axle) 21 is rotationally supported by bearings 24, 25, and 26 in the steering gear box 12. The bearing 24 supports the upper section of the rotation shaft (the steering axle) 21. The bearings 25 and 26 support the upper section and the lower section of the pinion gear 11b, respectively.

The reduction mechanism 5 is disposed on the rotation shaft (the steering axle) 21 on the opposite side of the bearing 25 from the pinion gear 11b. The reduction mechanism 5 includes a combination of a worm gear 5a formed in a driving shaft of the electric motor 4 and a worm wheel gear 5b coupled to the rotation shaft (the steering axle) 21. The reduction mechanism 5 transfers the assisting torque $A_H$ generated by the electric motor 4 to the rotation shaft (the steering axle) 21 via the worm gear 5a and the worm wheel gear 5b. Note that the assisting torque $A_H$ generated by the electric motor 4 is boosted in accordance with the gear ratio of the worm gear 5a to the worm wheel gear 5b. The rack and pinion gear mechanism 11 converts the boosted assisting torque $A_H$ into the thrust force (the pinion torque Tp) of the rack shaft 6 in the axis direction.

The rotation shaft (the steering axle) 21 has the magnetostrictive torque sensor 3 provided thereron. The magnetostrictive torque sensor 3 is disposed on the rotation shaft (the steering axle) 21 between the bearings 24 and 25. The rotation shaft (the steering axle) 21 also serves as a rotation shaft of the magnetostrictive torque sensor 3. The magnetostrictive torque sensor 3 detects the steering torque Ts input from the driver via the steering wheel 2. The magnetostrictive torque sensor 3 includes a magnetostrictive member 30 disposed on the surface of the rotation shaft (the steering axle) 21. In the magnetostrictive member 30, the amount of deformation is changed in accordance with the magnitude and the direction of the rotation torque applied to the rotation shaft (the steering axle) 21 and, therefore, the magnetic permeability is changed. The magnetostrictive member 30 includes a first magnetostrictive sub-member (area) 3a and a second magnetostrictive sub-member (area) 3b. The first magnetostrictive sub-member (area) 3a and the second magnetostrictive sub-member (area) 3b may be integrated into one body or may be separated from each other. Each of the first magnetostrictive sub-member 3a and the second magnetostrictive sub-member 3b is formed in the whole periphery of the rotation shaft (the steering axle) 21 so as to have a ring shape. It is desirable that the magnetostrictive member 30 (the first magnetostrictive sub-member 3a and the second magnetostrictive sub-member 3b) be formed from a Fe—Ni or Fe—Cr based magnetostrictive film. The magnetostrictive member 30 (the first magnetostrictive sub-member 3a and the second magnetostrictive sub-member 3b) may be coated, using a plating technique or a vapor-deposition technique, on the rotation shaft (the steering axle) 21 (e.g., the surface of the rotation shaft (the steering axle) 21 or a hollow tube that is press-fitted into the rotation shaft (the steering axle) 21, and the rotation shaft (the steering axle) 21 and the magnetostrictive member 30 (the first magnetostrictive sub-member 3a and the second magnetostrictive sub-member 3b) may be integrated into one body. Alternatively, the pre-manufactured magnetostrictive member 30 (the first magnetostrictive sub-member 3a and the second magnetostrictive sub-member 3b) may be bonded to the rotation shaft (the steering axle) 21 using an adhesive agent. The first magnetostrictive sub-member 3a and the second magnetostrictive sub-member 3b are deformed by a predetermined amount in the opposite directions so as to have the magnetic anisotropies in the opposite directions in advance. Accordingly, if the first magnetostrictive sub-member 3a and the second magnetostrictive sub-member 3b are deformed in the same direction by the same amount of deformation, the magnetic permeability of one of the first magnetostrictive sub-member 3a and the second magnetostrictive sub-member 3b is increased and the magnetic permeability of the other magnetostrictive sub-member is decreased. The amount of increase is the same as the amount of decrease.

Furthermore, the magnetostrictive torque sensor 3 includes a first detecting unit 37 on the periphery of the first magnetostrictive sub-member 3a and a second detecting unit 38 on the periphery of the second magnetostrictive sub-member 3b. The first detecting unit 37 and the second detecting unit 38 detect changes in the magnetic permeability of the first magnetostrictive sub-member 3a and the second magnetostrictive sub-member 3b as electrical changes, respectively.

The first detecting unit 37 includes a first exciting circuit (a first exciting coil) 31 and a first detection circuit (a first detection coil) 32. The first exciting circuit 31 is formed by winding a wire around a bobbin 36 in the circumferential direction of the rotation shaft (the steering axle) 21. Thus, the first exciting circuit 31 generates a magnetic field in an area in which the first magnetostrictive sub-member 3a is disposed. The first detection circuit 32 is formed by winding a wire around the bobbin 36 in the circumferential direction of the rotation shaft (the steering axle) 21. Thus, the first detection circuit 32 electrically detects the intensity of the magnetic field varied in accordance with the magnetic permeability of the first magnetostrictive sub-member 3a. Note that the first exciting circuit 31 and the first detection circuit 32 are provided separately using the coils each having a winding wire wound therearound many times. However, a single coil may be employed instead of the two coils.

Similarly, the second detecting unit 38 includes a second exciting circuit (a second exciting coil) 33 and a second detection circuit (a second detection coil) 34. The second exciting circuit 33 is formed by winding a wire around the bobbin 36 in the circumferential direction of the rotation shaft (the steering axle) 21. Thus, the second exciting circuit 33 generates a magnetic field in an area in which the second magnetostrictive sub-member 3b is disposed. The second detection circuit 34 is formed by winding a wire around the bobbin 36 in the circumferential direction of the rotation shaft (the steering axle) 21. Thus, the second detection circuit 34 electrically detects the intensity of the magnetic field varied in accordance with the magnetic permeability of the second magnetostrictive sub-member 3b. Note that the second exciting circuit 33 and the second detection circuit 34 are provided separately using the coils each having a winding wire wound therearound many times. However, a single coil may be employed instead of the two coils.

A coil turns N1 of the first exciting circuit (a first exciting coil) 31 differs from a coil turns N2 of the second exciting circuit (a second exciting coil) 33 (N1≠N2). In addition, a coil turns N3 of the first detection circuit (a first detection coil) 32 differs from a coil turns N4 of the second detection circuit (the second detection coil) 34 (N3≠N4).

The first exciting circuit (the first exciting coil) 31 and the second exciting circuit (the second exciting coil) 33 can generate magnetic fields having intensities formed in accordance with the coil turns N1 and N2 thereof, respectively. In addition, the first detection circuit (the first detection coil) 32 and the second detection circuit (the second detection coil) 34 can change the ratio between the electrical amounts detected for the intensities of the magnetic fields in accordance with the coil turns N1 and N2. Accordingly, by making the coil turns N1 of the first exciting coil 31 of the first detecting unit 37 different from the coil turns N2 of the second exciting coil 33 of the second detecting unit 38 or making the coil turns N3 of the first detection coil 32 of the first detecting unit 37 different from the coil turns N4 of the second detection coil 34 of the second detecting unit 38 (N1≠N2, N3≠N4), the first detection circuit (the first detection coil) 32 and the second detection circuit (the second detection coil) 34 can detect electrical changes of different amounts when the first magnetostrictive sub-member 3a and the second magnetostrictive sub-member 3b deform so that the amounts of change in deformation of the first magnetostrictive sub-member 3a and the second magnetostrictive sub-member 3b are the same.

The electrical changes in the first detecting unit 37 and the second detecting unit 38 monotonically increase or decrease with the changes in deformation of the first magnetostrictive sub-member 3a and the second magnetostrictive sub-member 3b. In addition, even when the amounts of change in deformation of the first magnetostrictive sub-member 3a and the second magnetostrictive sub-member 3b are the same, the first detecting unit 37 and the second detecting unit 38 can detect different amounts of electrical change by using the coil turns N1 and N2 (or N3 and N4). Accordingly, the first detecting unit 37 and the second detecting unit 38, inversely, can detect the same electrical changes for different amounts of change in deformation caused by the bending moments by adjusting the coil turns. Thus, the changes caused by the bending moments can be canceled out.

Note that since, in order to detect an amount of change in deformation, the physical quantity of an amount of change in deformation is converted into the physical quantity of an electrical change, it can be considered that the magnetostrictive torque sensor 3 includes two sensors that detect an amount of change in deformation in the form of an electrical change. One of these two sensors that detect an amount of change in deformation is formed from the first detecting unit 37 and the first magnetostrictive sub-member 3a that is magnetically coupled to the first detecting unit 37. The other sensor is formed from the second detecting unit 38 and the second magnetostrictive sub-member 3b that is magnetically coupled to the second detecting unit 38. By making the coil turns N1 different from the coil turns N2 (by making the coil turns N3 different from the coil turns N4), the two sensors can detect different amounts of electrical change for the same amounts of change in deformation. Therefore, it can be considered that the two sensors have different detection sensitivities.

In addition, since the bending moment may differ along the rotation shaft (the steering axle) 21, the need for changing the diameter of the rotation shaft (the steering axle) 21 at which the first magnetostrictive sub-member 3a is disposed from that at which the second magnetostrictive sub-member 3b is disposed can be eliminated. Therefore, the manufacturing cost of the rotation shaft (the steering axle) 21 can be reduced. Furthermore, since the first magnetostrictive sub-member 3a and the second magnetostrictive sub-member 3b can be disposed on a curved surface having a constant diameter and a constant radius of curvature so that the property is constant, the first magnetostrictive sub-member 3a and the second magnetostrictive sub-member 3b can be easily coated. Thus, the coating cost can be also reduced. As a result, the magnetostrictive torque sensor 3 can be manufactured at low cost.

When the driver steers the steering wheel 2, the steering torque Ts is generated. The steering torque Ts is transferred to the rotation shaft (the steering axle) 21. The transferred steering torque Ts is detected by the magnetostrictive torque sensor 3, and the first detecting unit 37 outputs an output VT10 as a detected signal. Similarly, the second detecting unit 38 outputs an output VT21. The outputs VT10 and VT21 are input to the control unit 9. The control unit 9 receives a vehicle speed signal V from a vehicle speed sensor 8 that detects the speed of the motor vehicle. In addition, the control unit 9 delivers a motor electrical current D to the electric motor 4. Furthermore, the control unit 9 receives a current measurement signal Do obtained by measuring the motor electrical current D and a motor rotation angle signal a obtained by measuring the rotation angle of the rotator of the electric motor 4. The control unit 9 outputs the motor electrical current D to the electric motor 4 on the basis of, for example, the received outputs VT10 and VT21, the vehicle speed signal V, the current measurement signal Do, and the motor rotation angle signal a.

The electric motor 4 outputs the assisting torque $A_H$ that assists the steering torque Ts using the motor electrical current D. The assisting torque $A_H$ is transferred to the rack shaft 6 via the reduction mechanism 5 and the rack and pinion gear mechanism 11. In addition, the assisting torque $A_H$ is converted into linear movement. Note that the steering torque Ts directly generated by the driver is also transferred to the rack shaft 6 via the rack and pinion gear mechanism 11 and is converted into linear movement.

The linear movement caused by the steering torque Ts transferred to the rack shaft 6 and the linear movement caused by the assisting torque $A_H$ are combined together and move the tie rod 14. Thus, the directions of travel of the wheels 10 are changed. By combining the assisting torque $A_H$ with the steering torque Ts, the steering torque Ts required for the driver to steer can be reduced. In addition, by rotating the steering wheel 2 by a steering angle θ, the directions of travel of the wheels 10 can be changed by a steering angle α.

For example, for simplicity, let the value of the steering torque Ts be "Ts", let the value of the assisting torque $A_H$ be $A_H$, and let a constant representing the assist ratio of the assisting torque $A_H$ to the steering torque Ts be a constant kA. Then, $A_H$=kA×Ts. In addition, let a pinion torque functioning as the load be "Tp". Since the pinion torque Tp is the sum of the steering torque Ts and the assisting torque $A_H$ (Tp=Ts+ $A_M$), Ts=Tp/(1+kA). Accordingly, the steering torque Ts is 1/(1+kA) of the pinion torque Tp (kA≥0). Thus, the steering torque Ts is smaller than the pinion torque Tp. As a result, the steering torque Ts is reduced. Note that in the above-described example, for simplicity, kA is defined as a constant value. However, it is desirable that kA decrease with an increase in the vehicle speed (the vehicle speed signal V). Therefore, in order to increase the steering torque Ts required for rotating the wheels 10 with respect to a road surface by the steering angle α when the load required for rotating the wheels 10 on the road surface is reduced as the motor vehicle travels at higher speed, the assisting torque $A_H$ can be reduced. In this way, the electrically-assisted power steering apparatus 1 does not provide an excessive assisting force to the driver.

Figure 2:
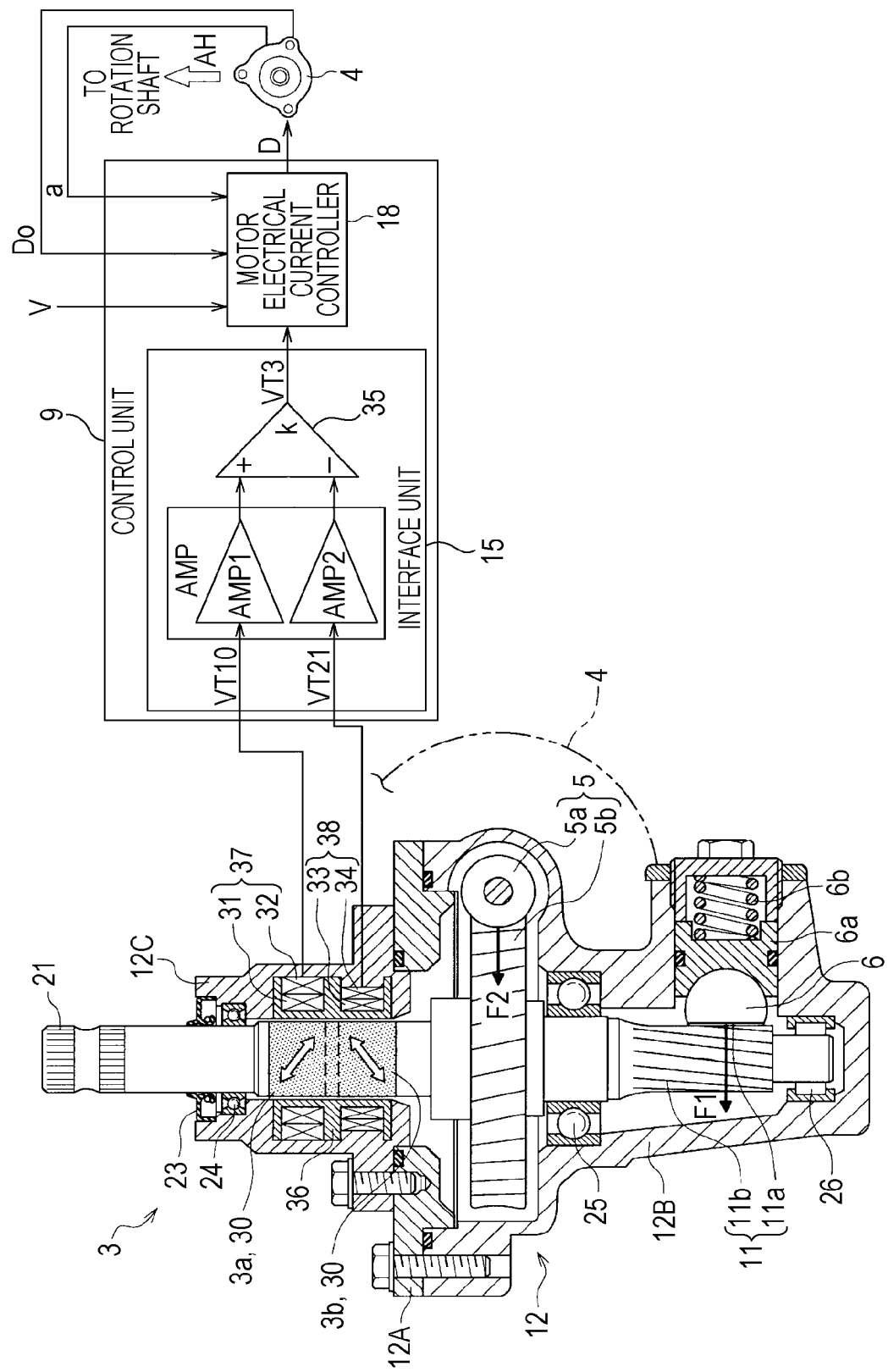
FIG. 2 illustrates an exemplary configuration of a magnetostrictive torque sensor and its vicinity in the electrically-assisted power steering apparatus.

FIG. 2 illustrates an exemplary configuration of the magnetostrictive torque sensor 3 and its vicinity in the electrically-assisted power steering apparatus 1. FIG. 2 is also a cross-sectional view taken along line II-II of FIG. 1. The control unit 9 includes an interface unit 15. The interface unit 15 includes a conversion circuit 35 and an amplifying unit AMP. The amplifying unit AMP includes an amplifying sub-unit AMP1 that amplifies the output VT10 and an amplifying sub-unit AMP2 that amplifies the output VT21. The conversion circuit 35 computes a difference between the output VT10 output from the amplifying sub-unit AMP1 and the output VT21 output from the amplifying sub-unit AMP2 (i.e., VT10-VT21). Thereafter, the amplifying unit AMP amplifies the difference by a gain k. In this way, the amplifying unit AMP computes a torque detection signal VT3. In addition, the control unit 9 includes a motor electrical current controller 18 that outputs the motor electrical current D for rotationally operating the electric motor 4 on the basis of the torque detection signal (the output) VT3, the vehicle speed signal V, the current measurement signal Do, and the motor rotation angle signal a. Note that the control unit 9 computes the sum of the output VT10 and the output VT21 (i.e., VT10+VT21). Thereafter, the control unit 9 determines whether the sum is within a predetermined range. In this way, the control unit 9 performs diagnosis for failure.

The steering gear box 12 includes a middle housing 12A, a lower housing 12B, and an upper housing 12C connected to each other using bolts. The rotation shaft (the steering axle) 21, the magnetostrictive torque sensor 3, the reduction mechanism 5, and the rack and pinion gear mechanism 11 are contained in the steering gear box 12. The upper end section of the rotation shaft (the steering axle) 21 protrudes from the upper housing 12C to the outside. Thus, the rotation shaft (the steering axle) 21 can be coupled to the steering wheel 2 (refer to FIG. 1) via the universal joints 13a and 13b (refer to FIG. 1). In addition, the electric motor 4 is attached to the lower housing 12B. The lower housing 12B includes a rack guide 6a that leads sliding of the rack shaft 6 in the axis direction and a spring 6b that urges the rack guide 6a towards the pinion gear 11b. A force F1 is exerted from the rack shaft 6 to the rotation shaft (the steering axle) 21 (the pinion gear 11b) in a direction perpendicular to the axis direction of the rotation shaft (the steering axle) 21. In addition, a force F2 is exerted from the worm gear 5a to the rotation shaft (the steering axle) 21 (the worm wheel gear 5b) in the direction perpendicular to the axis direction of the rotation shaft (the steering axle) 21. Due to the force F1 and the force F2, a bending moment is generated in the rotation shaft (the steering axle) 21 and, thus, in the first magnetostrictive sub-member 3a and the second magnetostrictive sub-member 3b disposed on the rotation shaft (the steering axle) 21.

The bending moment generated in the first magnetostrictive sub-member 3a and the second magnetostrictive sub-member 3b of the magnetostrictive torque sensor 3 is discussed in detail next.

Figure 3:
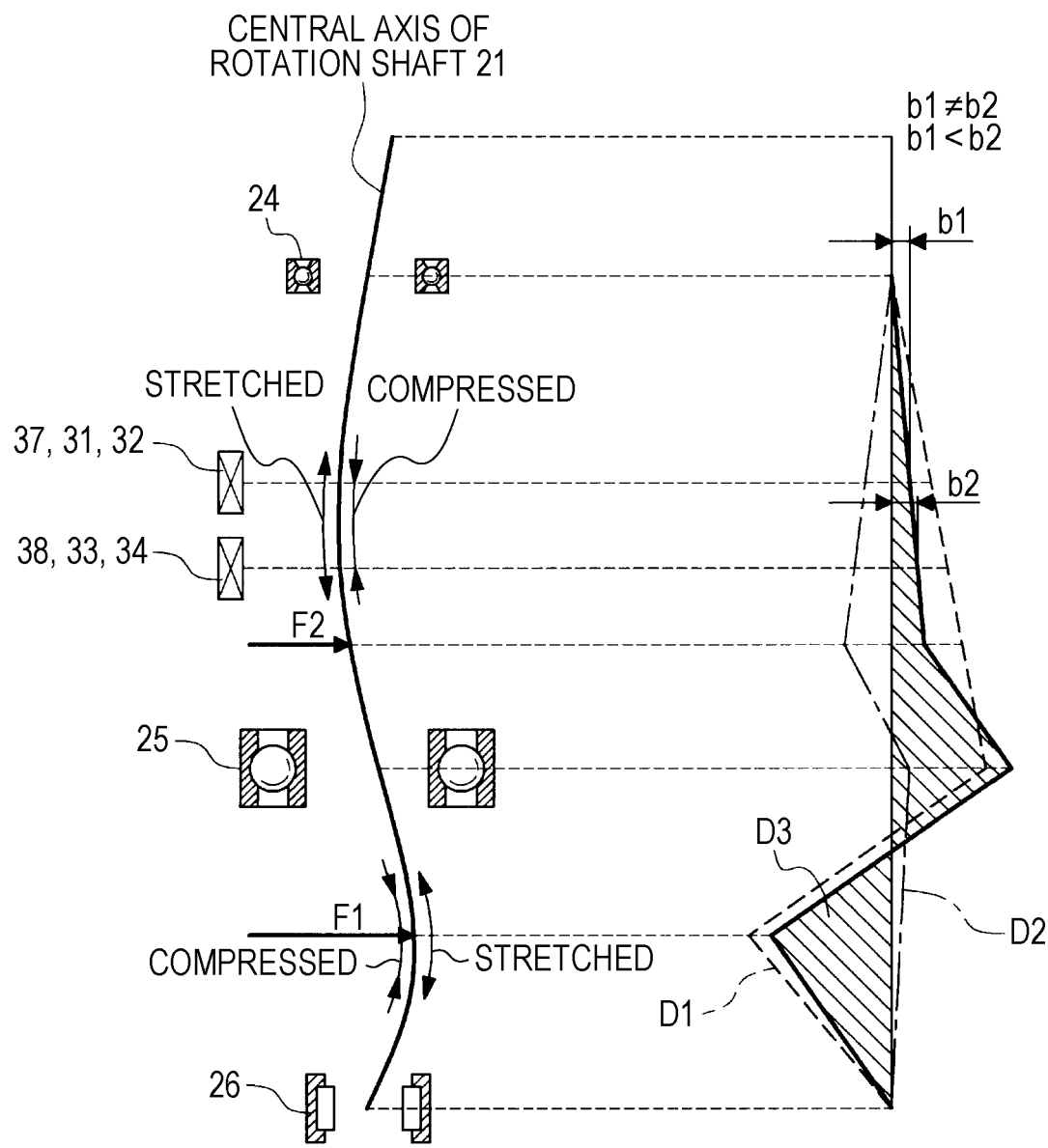
FIG. 3A is a schematic illustration of the bentness of the central axis of a rotation shaft.
FIG. 3B is a bending moment diagram illustrating the magnitude of the bending moment along the rotation shaft for the magnetostrictive torque sensor (having both ends that are fixed) according to the first exemplary embodiment.

To facilitate an understanding of bending occurring in the rotation shaft (the steering axle) 21, FIG. 3A illustrates some parts of the structure of the magnetostrictive torque sensor 3 serving as a fulcrum point and the point of load (the point of application). The rotation shaft (the steering axle) 21 is rotationally supported by the bearings 24, 25, and 26. The bearings 24, 25, and 26 serve as fulcrum points. The bearing 24 is disposed on the upper section of the rotation shaft (the steering axle) 21. The bearings 24 and 25 are disposed so as to sandwich the first detecting unit 37 (the first exciting circuit 31 and the first detection circuit 32) disposed so as to face the first magnetostrictive sub-member 3a and the second detecting unit (the second exciting circuit 33 and the second detection circuit 34) disposed so as to face the second magnetostrictive sub-member 3b. The bearing 25 is disposed between the point of load (the point of application) at which the force F2 is exerted by the reduction mechanism 5 and the point of load (the point of application) at which the force F1 is exerted by the rack and pinion gear mechanism 11. The point of load (the point of application) at which the force F2 is exerted is located beneath the second detecting unit 38. The bearing 26 is disposed on the lower section of the rotation shaft (the steering axle) 21 and on the side of the end section from the point of load (the point of application) at which the force F1 is exerted.

When the assisting torque $A_H$ is output from the electric motor 4, the assisting torque $A_H$ is transferred to the rotation shaft (the steering axle) 21 via the reduction mechanism 5. At that time, in the reduction mechanism 5, the worm gear 5a is engaged with the worm wheel gear 5b and, therefore, a tilt angle (a helical angle) is formed so that the worm wheel gear 5b tends to move away from the worm gear 5a due to the pressure angle (e.g., about 10 degrees) formed between the worm gear 5a and the worm wheel gear 5b. Thus, the force F2 is generated between the worm gear 5a and the worm wheel gear 5b in a direction in which the worm gear 5a tends to move away from the worm wheel gear 5b. The force F2 is applied to the rotation shaft (the steering axle) 21. The force F2 increases with an increase in the assisting torque $A_H$.

The assisting torque $A_H$ transferred to the rotation shaft (the steering axle) 21 is further transferred to the rack shaft 6 via the rack and pinion gear mechanism 11. At that time, in the rack and pinion gear mechanism 11, the pinion gear 11b is engaged with the rack gear 11a and, therefore, a tilt angle (a helical angle) is formed so that the pinion gear 11b tends to move away from the rack shaft 6 due to the pressure angle (e.g., about 20 degrees) formed between the pinion gear 11b and the rack gear 11a. Thus, the force F1 is generated between the pinion gear 11b and the rack gear 11a in a direction in which the pinion gear 11b tends to move away from the rack gear 11a. The force F1 is applied to the rotation shaft (the steering axle) 21. The force F1 also increases with an increase in the assisting torque $A_H$.

Note that comparison of the forces F1 and F2 indicates that the directions of the forces F1 and F2 are substantially parallel to each other, and the magnitude of the force F1 is larger than the magnitude of the force F2 (F1>F2).

In FIG. 3A, the bold line schematically indicates the displacement of the central axis of the rotation shaft (the steering axle) 21 that is bent by the force F1 and F2. Note that for the sake of better understanding, the displacement is larger than the actual displacement. As indicated by the bold line, the bending moment that causes the rotation shaft (the steering axle) 21 to bend is generated due to the forces F1 and F2. The displacement of the central axis of the rotation shaft (the steering axle) 21 has nodes at the positions of the bearings 24, 25, and 26. In addition, the point of application of the force F1 is located between the bearings 25 and 26. Accordingly, the rotation shaft (the steering axle) 21 is displaced so that the side onto which the force F1 is applied is compressed and the other side is stretched. Furthermore, the central axis of the rotation shaft (the steering axle) 21 between the bearings 24 and 25 is displaced by the force F1 in the opposite direction with the bearing 25 serving as a fixed point so that the side onto which the force F1 is applied is stretched and the other side is compressed. Note that the force F2 is applied to the rotation shaft (the steering axle) 21 between the bearing 24 and the bearing 25. The direction of the force F2 is the same as that of the force F1. However, the magnitude of the force F2 is smaller than that of the force F1. Therefore, the force F2 only reduces the displacement of the central axis of the rotation shaft (the steering axle) 21 between the bearings 24 and 25 caused by the force F1. Thus, the rotation shaft (the steering axle) 21 having the first magnetostrictive sub-member 3a that faces the first detecting unit 37 (the first exciting circuit 31 and the first detection circuit 32) and the second magnetostrictive sub-member 3b that faces the second detecting unit 38 (the second exciting circuit 33 and the second detection circuit 34) is bent by the bending moment and, therefore, the rotation shaft (the steering axle) 21 is deformed. As a result, the first magnetostrictive sub-member 3a and the second magnetostrictive sub-member 3b are also deformed.

FIG. 3B is a bending moment diagram (BMD) D3 that indicates the magnitude of the bending moment along the rotation shaft (the steering axle) 21. The bending moment diagram D3 (shown by a bold line) is complicated since two forces, that is, the force F1 and the force F2, are applied. Accordingly, a bending moment diagram D1 (shown by a dashed line) is computed (obtained) when only the force F1 is applied without the force F2, and a bending moment diagram D2 (shown by a alternate long and short dash line) is computed (obtained) when only the force F2 is applied without the force F1. Thereafter, the computed bending moment diagram D1 and the computed bending moment diagram D2 are summed. In this way, the desired bending moment diagram D3 is obtained (D3=D1+D2). By comparing the bending moment diagram D3 with the bending moment diagram D1, the effect of the bending moment diagram D2, that is, the effect of the force F2 can be obtained. That is, in the bending moment diagrams D3 and D1, the bending moments increase from the bearing 24 to the point of load of the force F2. In contrast, in the bending moment diagram D3, the slope (the rate of increase) of the bending moment from the bearing 24 to the point of load of the force F2 is smaller than that in the bending moment diagram D1. Although the slope is small, the slope is still present. A bending moment b1 applied to the first magnetostrictive sub-member 3a that faces the first detecting unit 37 (the first exciting circuit 31 and the first detection circuit 32) differs from a bending moment b2 applied to the second magnetostrictive sub-member 3b that faces the second detecting unit 38 (the second exciting circuit 33 and the second detection circuit 34) (b1≠b2). The bending moment b1 is smaller than the bending moment b2 (b1<b2).

Figure 4:
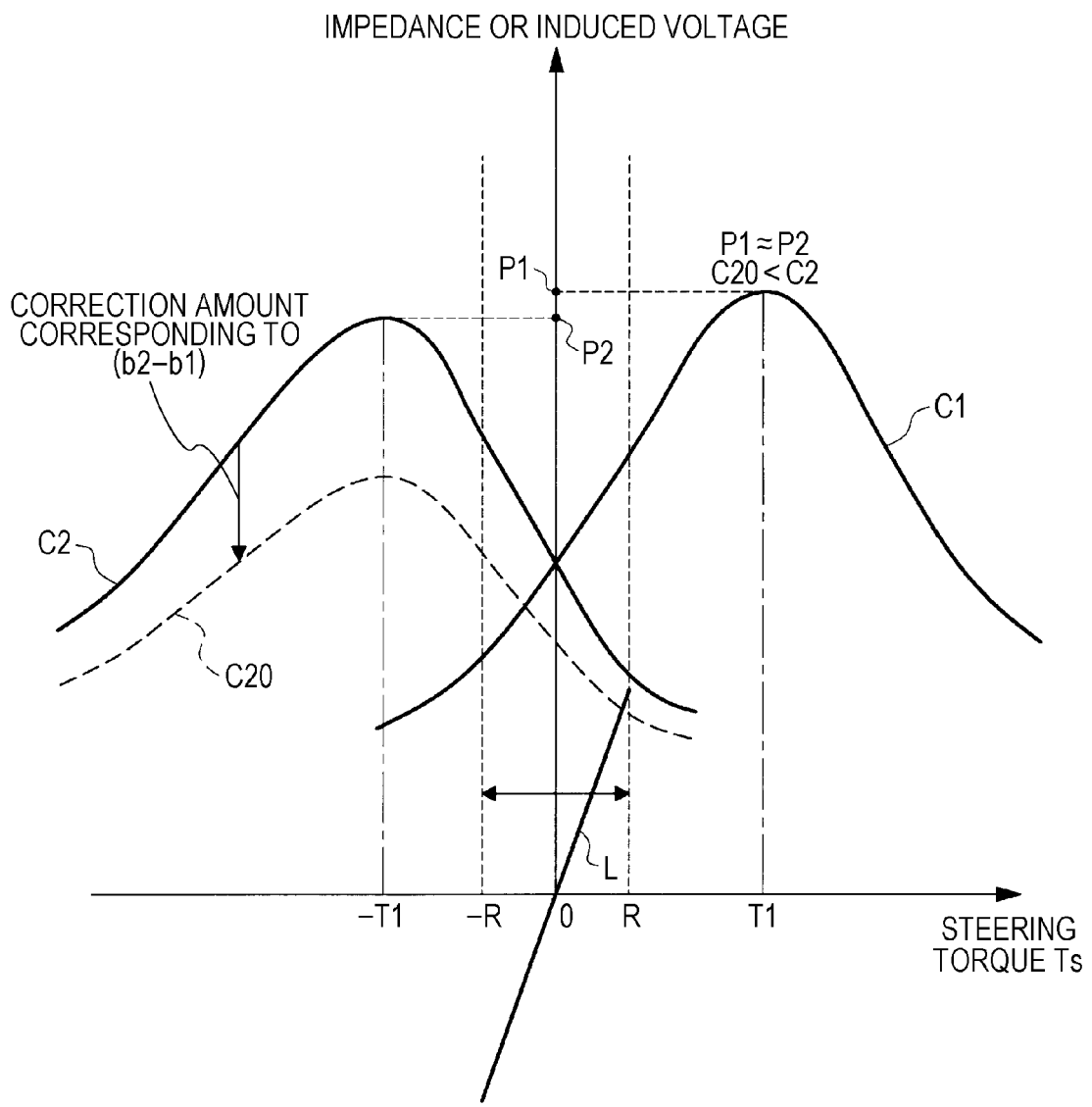
FIG. 4 is a graph illustrating an impedance or an induced voltage versus input steering torque in the magnetostrictive torque sensor according to the first exemplary embodiment.

FIG. 4 illustrates an example of the inverse magnetostrictive property of the magnetostrictive torque sensor 3 according to the first exemplary embodiment. The abscissa represents the input steering torque Ts, and the ordinate represents the impedance or the induced voltage detected by the detection circuits 32 and 34 when an AC voltage is applied to the exciting circuits 31 and 33, respectively.

The curved line C1 represents the impedance or the induced voltage detected by the first detection circuit 32 when an AC voltage is applied to the first exciting circuit 31. The curved line C1 indicates that as the steering torque increases from a negative value to a positive value, the impedance or the induced voltage increases. When the steering torque has a positive value T1, the impedance or the induced voltage has a peak value P1. As the steering torque increases from the value T1, the impedance or the induced voltage decreases. In the range between the upper detection limit R and the lower detection limit −R of the steering torque Ts, the curved line C1 is linear with a substantially positive constant slope and indicates an increasing impedance or induced voltage.

The curved line C2 represents the impedance or the induced voltage detected by the second detection circuit 34 when the coil turns N2 of each of the second exciting circuit 33 and the second detection circuit 34 is the same as the coil turns N1 of each of the first exciting circuit 31 and the first detection circuit 32 and if an AC voltage is applied to the second exciting circuit 33. The curved line C2 indicates that as the steering torque decreases from a positive value to a negative value, the impedance or the induced voltage increases. When the steering torque has a negative value −T1, the impedance or the induced voltage has a peak value P2. As the steering torque further decreases from the value −T1, the impedance or the induced voltage decreases. Note that the absolute value of −T1 is substantially the same as the positive value T1. In addition, the peak value P2 is substantially the same as the peak value P1. In the range between the upper detection limit R and the lower detection limit −R of the steering torque Ts, the curved line C2 is linear with a substantially negative constant slope and indicates a decreasing impedance or induced voltage. At that time, the absolute value of the slope of the curved line C2 is substantially the same as the positive slope of the curved line C1 in the detection range. The values of the curved lines C1 and C2 are substantially the same when the steering torque Ts is 0 (zero). The curved lines C1 and C2 are substantially symmetrical with respect to the ordinate serving as a symmetric line. Accordingly, a linear line L can be obtained by subtracting the impedance or the induced voltage indicated by the curved line C2 from the impedance or the induced voltage indicated by the curved line C1 in the detection range. The linear line L passes through an origin point (when the steering torque Ts is 0 (zero), the impedance or the induced voltage is also 0 (zero)). In addition, the linear line L has a slope twice the positive slope of the curved line C1 in the detection range. By using the relationship regarding the linear line L, the magnetostrictive torque sensor 3 can detect the steering torque with high sensitivity.

In the first exemplary embodiment, the coil turns N2 of the second exciting circuit 33 differs from the coil turns N1 of the first exciting circuit 31 (i.e., the coil turns N2 of the second exciting circuit 33 is smaller than the coil turns N1 of the first exciting circuit 31) (N2<N1), and/or the coil turns N4 of the second detection circuit 34 differs from the coil turns N3 of the first detection circuit 32 (i.e., the coil turns N4 of the second detection circuit 34 is smaller than the coil turns N3 of the first detection circuit 32) (N4<N3). Accordingly, as indicated by a curved line C20 (a dashed line), when an AC voltage is applied to the second exciting circuit 33, the impedance or the induced voltage detected by the second detection circuit 34 is decreased from the curved line C2 by a value corresponding to the corrected amount. Thus, the slope is made smaller (gentler) than that of the curved line C2. The corrected amount corresponds to a difference (b2−b1) between the bending moments b1 and b2 (refer to FIG. 3B).

Note that in the first exemplary embodiment, the detection sensitivity of the second detecting unit 38 is made lower than that of the first detecting unit 37 and, thus, the slope of the curved line C2 for the second detecting unit 38 is decreased to the slope of the curved line C20. However, a technique is not limited thereto. That is, the detection sensitivity of the first detecting unit 37 may be made higher than that of the second detecting unit 38, and the slope for the first detecting unit 37 may be made much larger than that of the slope of the curved line C1. In this way, an effect of the difference between the bending moments b1 and b2 may be removed. This can apply to other exemplary embodiments described below.

Note that in order to provide the inverse magnetostrictive property (the magnetic anisotropy), the following technique, for example, can be employed. First, the magnetostrictive member 30 (the first magnetostrictive sub-member (area) 3a and the second magnetostrictive sub-member (area) 3b) is coated on the rotation shaft (the steering axle) 21 so as to have a thickness of 40 μm. Subsequently, a middle portion of the rotation shaft (the steering axle) 21 between the first magnetostrictive sub-member (area) 3a and the second magnetostrictive sub-member (area) 3b is supported so that the rotation shaft (the steering axle) 21 does not rotate. Thereafter, the portions of the rotation shaft (the steering axle) 21 located the outer side of the first magnetostrictive sub-member (area) 3a and the outer side of the second magnetostrictive sub-member (area) 3b are twisted in the same rotation direction. In this way, a twisting torque of 2 kgm is applied. In addition, heat of 150° C. to 550° C. is applied for 10 minutes to 20 hours.

Figure 5:
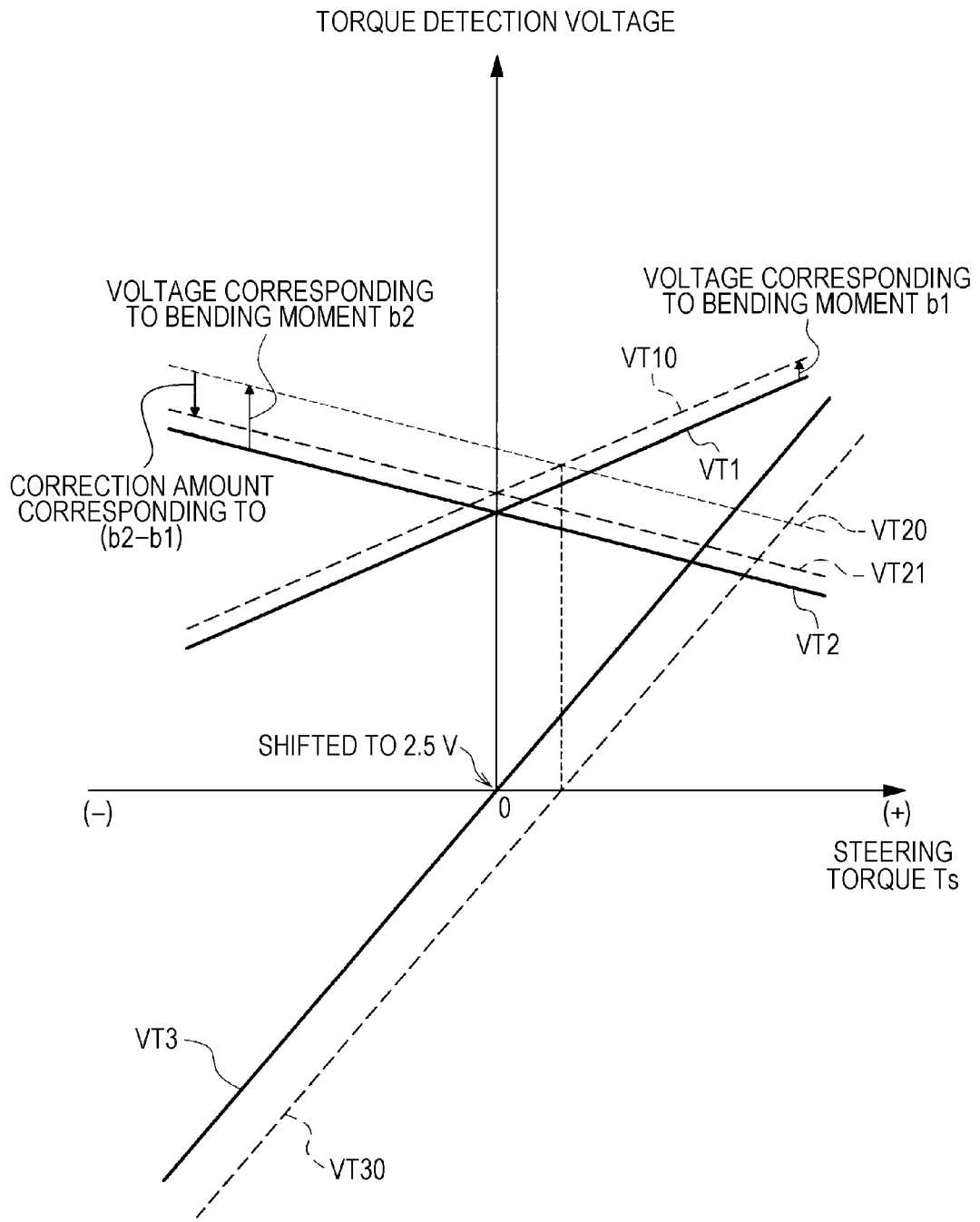
FIG. 5 is a graph illustrating the input steering torque versus a torque detection voltage.

FIG. 5 is a graph illustrating the input steering torque Ts versus the torque detection voltages (the outputs) VT10 and VT21 (refer to FIGS. 1 and 2) in the magnetostrictive torque sensor 3 according to the first exemplary embodiment. The range of the steering torque Ts indicated by the abscissa in FIG. 5 corresponds to the detection range between the upper limit R and the lower limit −R of detection of the steering torque is shown in FIG. 4. In addition, the physical quantity "torque detection voltage" ("output") represented by the ordinate in FIG. 5 has a relationship (a proportionate relationship) with the physical quantity "impedance or induced voltage" represented by the ordinate in FIG. 4.

More specifically, the curved line C1 in the detection range in FIG. 4 corresponds to a torque detection voltage (an output) VT1 in FIG. 5. The curved line C2 in the detection range in FIG. 4 corresponds to a torque detection voltage (an output) VT2 in FIG. 5.

The torque detection voltage (the output) VT1 is output from the first detecting unit 37. As illustrated in FIGS. 3A and 3B, the bending moment b1 is generated in the first detecting unit 37. In reality, the first detecting unit 37 outputs the torque detection voltage (the output) VT10 which is the sum of the torque detection voltage (the output) VT1 and a voltage corresponding to the bending moment b1.

The torque detection voltage (the output) VT2 is output from the second detecting unit 38. As illustrated in FIGS. 3A and 3B, the bending moment b2 is generated in the second detecting unit 38. Accordingly, the second detecting unit 38 outputs the torque detection voltage (the output) VT20 which is the sum of the torque detection voltage (the output) VT2 and a voltage corresponding to the bending moment b2. However, according to the first exemplary embodiment, the second detecting unit 38 outputs the torque detection voltage (the output) VT21 obtained by subtracting, from the torque detection voltage (the output) VT20, a correction amount corresponding to the difference (b2−b1) which is a difference between the bending moment b1 and the bending moment b2.

In an ideal state in which the bending moments b1 and b2 are not generated, the torque detection voltage (the output) VT3 can be obtained by subtracting the torque detection voltage (the output) VT2 from the torque detection voltage (the output) VT1. The torque detection voltages (the outputs)

VT1 and VT2 have different signs of the slopes and the same absolute value of the slopes. In addition, the torque detection voltages (the outputs) VT1 and VT2 have the same value at a steering torque of 0 (zero). Therefore, the curve of the torque detection voltage (the output) VT3 passes through the origin point and has a slope twice the slope of the torque detection voltage (the output) VT1. As a result, the steering torque can be detected with high sensitivity.

Subsequently, in an existing case in which although bending moments b1 and b2 are generated, a correction process is not performed, the steering torque is detected using a torque detection voltage (an output) VT30 obtained by subtracting the torque detection voltage (the output) VT20 from the torque detection voltage (the output) VT10. The bending moment b1 differs from the bending moment b2, and the bending moment b2 is larger than the bending moment b1 (b1<b2). Accordingly, the voltages corresponding to the bending moments cannot be canceled out and, therefore, the torque detection voltage becomes 0 (zero) in the positive range of the steering torque Ts. As a result, the driver feels dissatisfied with the steering feel.

Therefore, according to the first exemplary embodiment, the torque detection voltage (the output) VT21 is output. The torque detection voltage (the output) VT21 is obtained by subtracting, from the torque detection voltage (an output) VT20, a correction amount corresponding to the difference (b2−b1) which is a difference between the bending moment b1 and the bending moment b2. This is equivalent to making the detection sensitivity of the second detecting unit 38 different from the detection sensitivity of the first detecting unit 37 and making the detection sensitivity of the second detecting unit 38 smaller than the detection sensitivity of the first detecting unit 37. Since the torque detection voltages (the outputs) VT21 and VT10 have different signs of the slopes and the same absolute value of the slopes. In addition, the torque detection voltages (the outputs) VT21 and VT10 have the same value at the steering torque of 0 (zero). Therefore, the curve of the torque detection voltage (the output) VT3 obtained by subtracting the torque detection voltage (the output) VT21 from the torque detection voltage (the output) VT10 is the same as the curve in the above-described ideal case. The curve of the torque detection voltage (the output) VT3 passes through the origin point and has a slope twice the slope of the torque detection voltage (an output) VT1. In this way, the bending moments can be canceled out and, therefore, the steering torque can be detected with high sensitivity. Note that in practice, VT21 is subtracted from VT10 in the conversion circuit 35 (refer to FIG. 2), and the difference is multiplied by the coefficient (the gain) k. Thus, VT3 is obtained (VT3=k·(VT10−VT21)). In addition, VT3 is shifted so as to output 2.5 V when the steering torque Ts is 0 (zero). Furthermore, a particular correction value for the correction amount can be determined by performing adjustment so that the coin turn ratio between the coils (N1/N2 or N3/N4) is the same as the inverse of the bending moment ratio (b1/b2).

Second Exemplary Embodiment

Figure 6A:
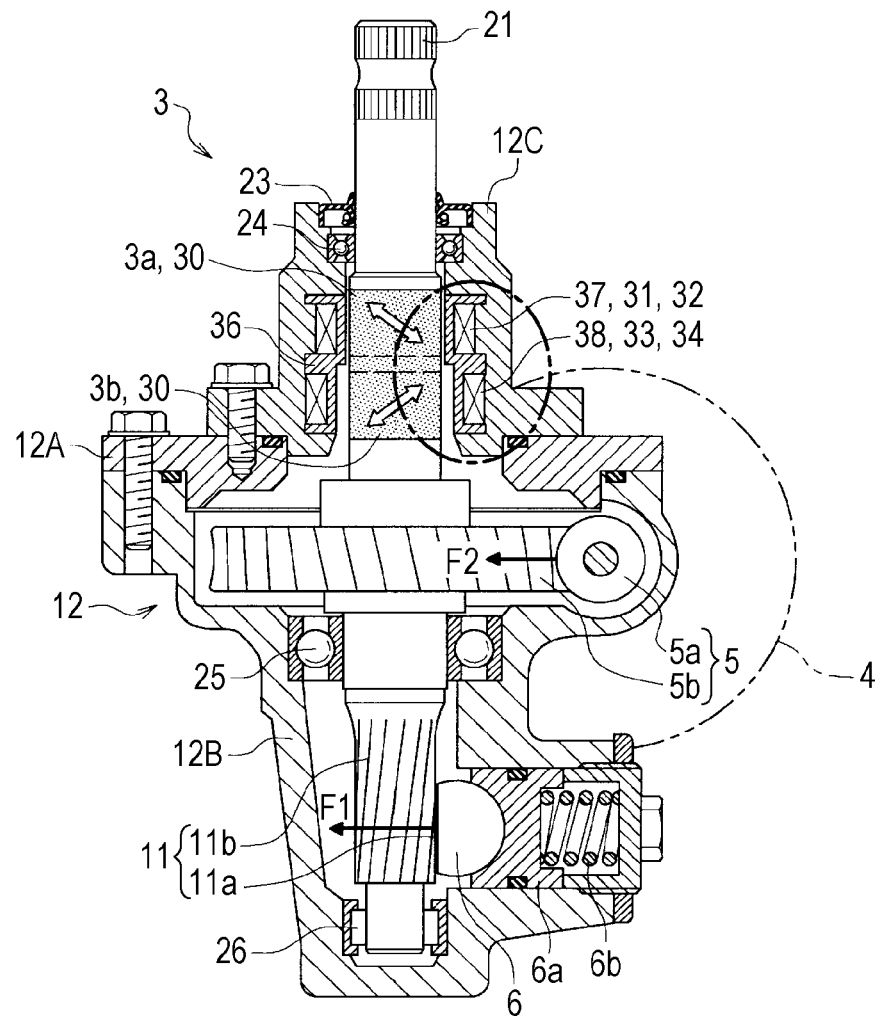
FIGS. 6A and 6B illustrate an exemplary configuration of a magnetostrictive torque sensor and its vicinity in an electrically-assisted power steering apparatus according to a second exemplary embodiment of the present invention.
Figure 6B:
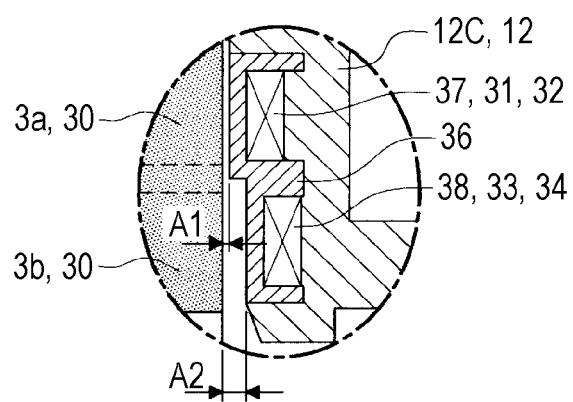

FIG. 6A illustrates a magnetostrictive torque sensor 3 of an electrically-assisted power steering apparatus and its vicinity according to a second exemplary embodiment of the present invention. FIG. 6B is an enlarged view of a section encircled by a long dashed dotted line in FIG. 6A. The magnetostrictive torque sensor 3 according to the second exemplary embodiment differs from the magnetostrictive torque sensor 3 according to the first exemplary embodiment in that the coil turns N1 and N2 are made to be the same (N1=N2), air gaps A1 and A2 provided between the magnetostrictive member 30 and the first detecting unit 37 and between the magnetostrictive member 30 and the second detecting unit 38 differ from each other (A1≠A2), and the bobbin 36 has a stepped structure. More specifically, the air gap A1 provided between the first magnetostrictive sub-member 3a and the first detecting unit 37 is smaller than the air gap A2 provided between the second magnetostrictive sub-member 3b and the second detecting unit 38 (A1<A2). Like the first exemplary embodiment, this structure can also make the detection sensitivity of the second detecting unit 38 different from the detection sensitivity of the first detecting unit 37 and make the detection sensitivity of the second detecting unit 38 smaller than the detection sensitivity of the first detecting unit 37. Therefore, like the first exemplary embodiment, the bending moments can be canceled out. Thus, the rotational moment of the rotation shaft (the steering axle) 21 can be accurately detected and, therefore, the steering feel can be improved.

Third Exemplary Embodiment

Figure 7A:
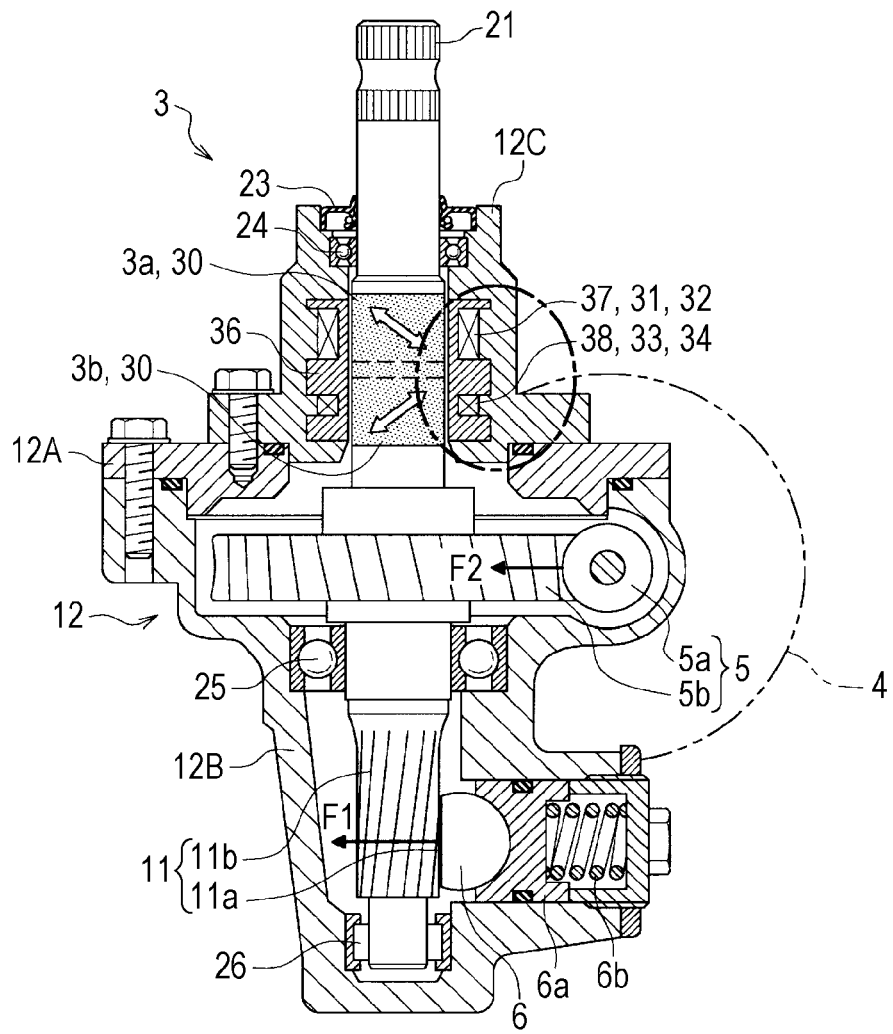
FIGS. 7A and 7B illustrate an exemplary configuration of a magnetostrictive torque sensor and its vicinity in an electrically-assisted power steering apparatus according to a third exemplary embodiment of the present invention.
Figure 7B:
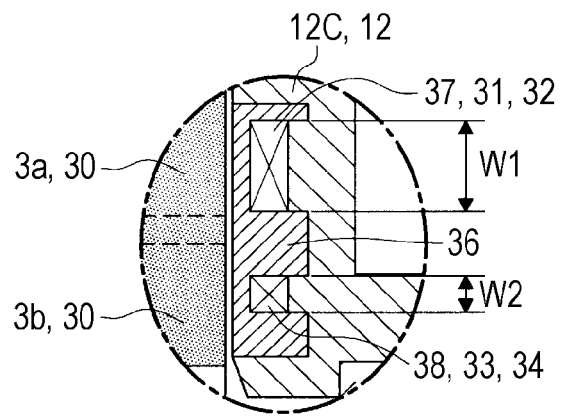

FIG. 7A illustrates a magnetostrictive torque sensor 3 of an electrically-assisted power steering apparatus and its vicinity according to a third exemplary embodiment of the present invention. FIG. 7B is an enlarged view of a section encircled by a long dashed dotted line in FIG. 7A. The magnetostrictive torque sensor 3 according to the third exemplary embodiment differs from the magnetostrictive torque sensor 3 according to the first exemplary embodiment in that the coil turns N1 and N2 (N3 and N4) are made to be the same (N1=N2 and N3=N4) and widths W1 and W2 of the coils of the first detecting unit 37 and the second detecting unit 38 wound around the bobbin 36 in the circumferential direction of the rotation shaft (the steering axle) 21 in the axis direction of the rotation shaft (the steering axle) 21 differ from each other (W1≠W2). More specifically, the width W1 of the coil of the first detecting unit 37 is larger than the width W2 of the coil of the second detecting unit 38 (W1>W2). Like the first exemplary embodiment, this structure can also make the detection sensitivity of the second detecting unit 38 different from the detection sensitivity of the first detecting unit 37 and make the detection sensitivity of the second detecting unit 38 smaller than the detection sensitivity of the first detecting unit 37. Therefore, like the first exemplary embodiment, the bending moments can be canceled out. Thus, the rotational moment of the rotation shaft (the steering axle) 21 can be accurately detected and, therefore, the steering feel can be improved. Note that the widths W1 and W2 correspond to the widths of grooves used when winding wires are wound around the bobbin 36. By changing the widths of the grooves, the widths W1 and W2 can be changed.

Fourth Exemplary Embodiment

Figure 8A:
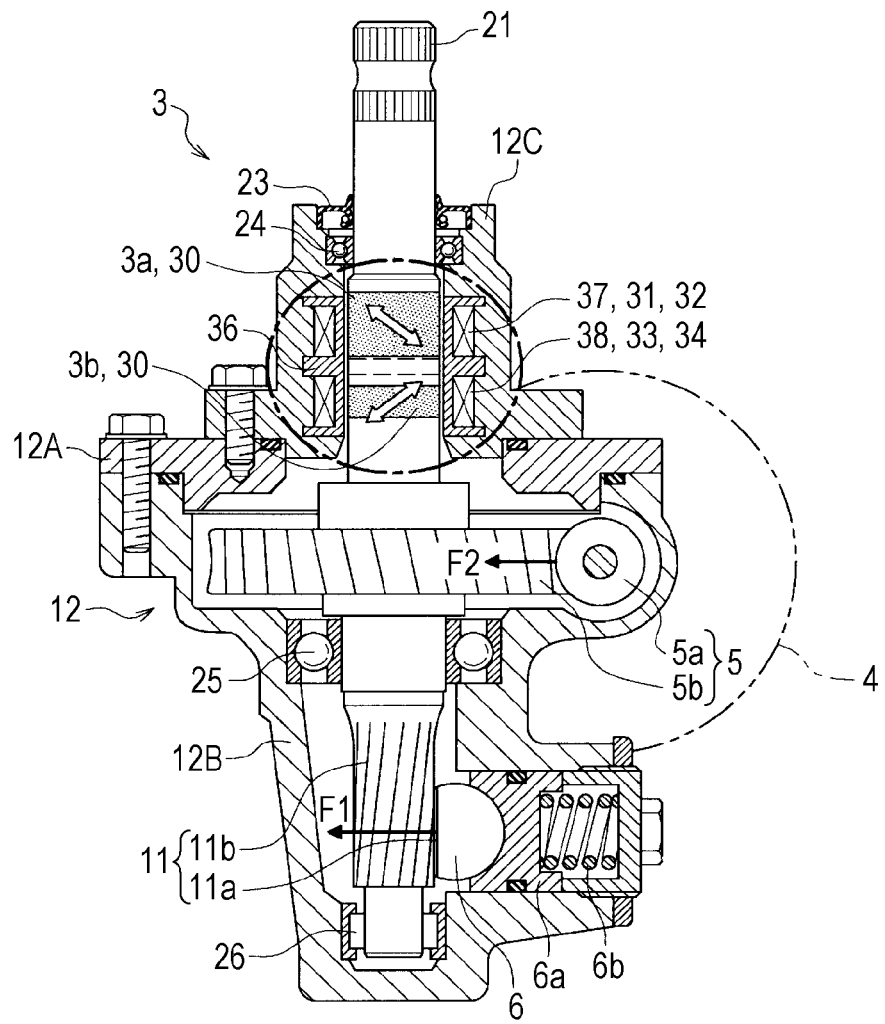
FIGS. 8A and 8B illustrate an exemplary configuration of a magnetostrictive torque sensor and its vicinity in an electrically-assisted power steering apparatus according to a fourth exemplary embodiment of the present invention.
Figure 8B:
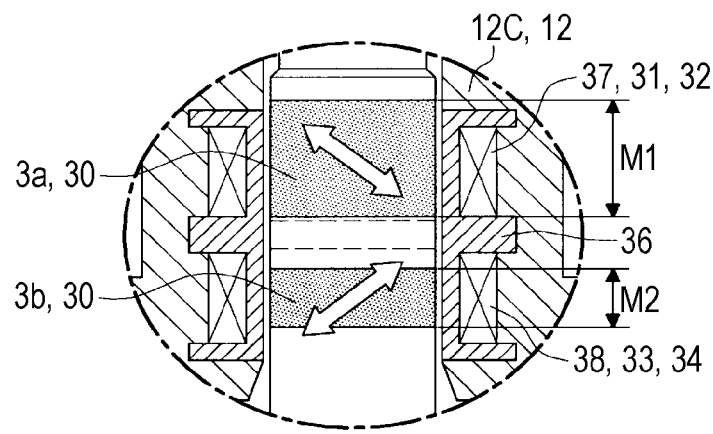

FIG. 8A illustrates a magnetostrictive torque sensor 3 of an electrically-assisted power steering apparatus and its vicinity according to a fourth exemplary embodiment of the present invention. FIG. 8B is an enlarged view of a section encircled by a long dashed dotted line in FIG. 8A. The magnetostrictive torque sensor 3 according to the fourth exemplary embodiment differs from the magnetostrictive torque sensor 3 according to the first exemplary embodiment in that the coil turns N1 and N2 (N3 and N4) are made to be the same (N1=N2 and N3=N4) while widths M1 and M2 of the first magnetostrictive sub-member 3a and the second magnetostrictive sub-member 3b that are divided so as to face the detecting units 37 and 38, respectively, differ from each other (M1≠M2). More specifically, the width M1 of the first magnetostrictive sub-member 3a is larger than the width M2 of the second magnetostrictive sub-member 3b (M1>M2). Like the first exemplary embodiment, this structure can also make the detection sensitivity of the second detecting unit 38 different from the detection sensitivity of the first detecting unit 37 and make the detection sensitivity of the second detecting unit 38 smaller than the detection sensitivity of the first detecting unit 37. Therefore, like the first exemplary embodiment, the bending moments can be canceled out. Thus, the rotational moment of the rotation shaft (the steering axle) 21 can be accurately detected and, therefore, the steering feel can be improved.

Fifth Exemplary Embodiment

Figure 9:
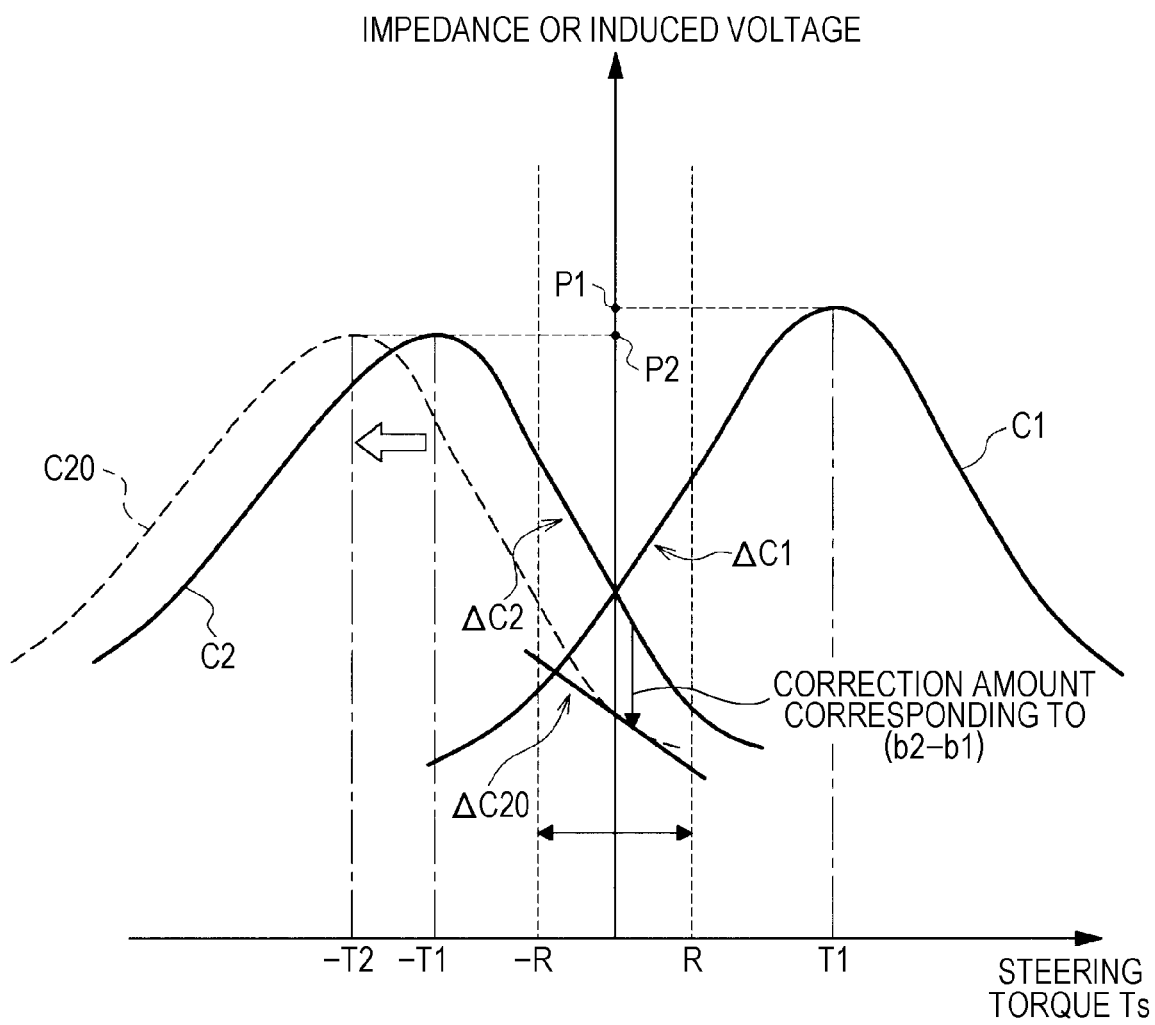
FIG. 9 is a graph illustrating an impedance or an induced voltage versus input steering torque in a magnetostrictive torque sensor according to a fifth exemplary embodiment.

FIG. 9 is a graph illustrating the impedance or the induced voltage versus the input steering torque Ts in a magnetostrictive torque sensor 3 according to a fifth exemplary embodiment of the present invention. The magnetostrictive torque sensor 3 according to the fifth exemplary embodiment differs from the magnetostrictive torque sensor 3 according to the first exemplary embodiment in that the coil turns N1 and N2 (N3 and N4) are made to be the same (N1=N2 and N3=N4) while pre-distortion amounts of the first magnetostrictive sub-member 3a and the second magnetostrictive sub-member 3b that face the detecting units 37 and 38, respectively, differ from each other (i.e., the pre-torques differ from each other). More specifically, the peak value P1 of the curved line C1 regarding the first magnetostrictive sub-member 3a can be obtained using the steering torque T1. In existing cases, as indicated by the curved line C2, in the curved line regarding the second magnetostrictive sub-member 3b, the peak value P2 can be obtained using the steering torque −T1 having a sign opposite to that of the steering torque T1 and having the absolute value that is the same as that of the steering torque T1. However, according to the fifth exemplary embodiment, as indicated by the curved line C20, in the curved line regarding the second magnetostrictive sub-member 3b, the peak value P2 can be obtained using the steering torque −T2 having a sign opposite to that of the steering torque T1 and having the absolute value that is larger than that of the steering torque T1 (T2>T1). The direction of pre-distortion of the second magnetostrictive sub-member 3b is opposite to the direction of pre-distortion of the first magnetostrictive sub-member 3a, and the amount of pre-distortion of the second magnetostrictive sub-member 3b is greater than the amount of pre-distortion of the first magnetostrictive sub-member 3a. The curved line C20 regarding the second magnetostrictive sub-member 3b according to the fifth exemplary embodiment is shifted in the negative direction of the steering torque Ts, as compared with the curved line C2 regarding existing electrically-assisted power steering apparatuses.

The magnetic permeability of a magnetostrictive member varies with an amount of deformation. However, the curved line of the magnetic permeability does not have a constant slope throughout the range of deformation. Accordingly, if the amount of deformation is offset by deforming the magnetostrictive member in advance, the amount of electrical change detected by a detection unit with respect to an amount of change in deformation (i.e., the detection sensitivity) can be changed. More specifically, the pre-torque of the second magnetostrictive sub-member 3b is set to a large value, and the absolute value of the slope ΔC20 of the curved line C20 in the detection area (the area between −R and R) is made smaller than the absolute value of the slope ΔC2 (ΔC1) of the curved line C2 (C1) in the detection area. In this way, the detection sensitivity is decreased. Like the first exemplary embodiment, this structure can also make the detection sensitivity of the second detecting unit 38 different from the detection sensitivity of the first detecting unit 37 and make the detection sensitivity of the second detecting unit 38 smaller than the detection sensitivity of the first detecting unit 37. Therefore, like the first exemplary embodiment, the bending moments can be canceled out. Thus, the rotational moment of the rotation shaft (the steering axle) 21 can be accurately detected and, therefore, the steering feel can be improved.

Sixth Exemplary Embodiment

Figure 10:
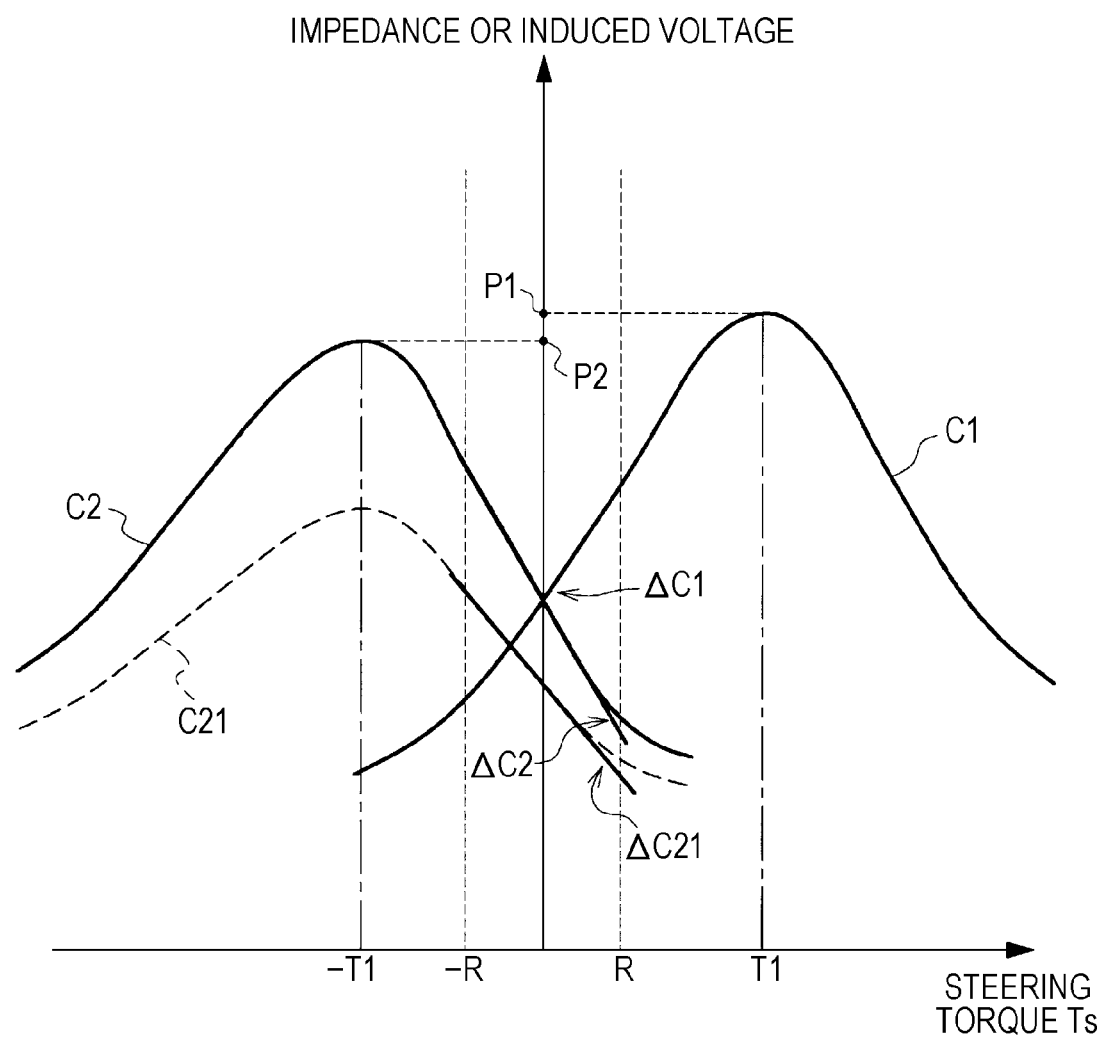
FIG. 10 is a graph illustrating an impedance or an induced voltage versus input steering torque in a magnetostrictive torque sensor according to a sixth exemplary embodiment.

FIG. 10 is a graph illustrating the input steering torque Ts versus the impedance or the induced voltage in a magnetostrictive torque sensor 3 according to a sixth exemplary embodiment of the present invention. The magnetostrictive torque sensor 3 according to the sixth exemplary embodiment differs from the magnetostrictive torque sensor 3 according to the first exemplary embodiment in that the coil turns N1 and N2 (N3 and N4) are made to be the same (N1=N2 and N3=N4) while the relative proportions of iron of the first magnetostrictive sub-member 3a and the second magnetostrictive sub-member 3b that face the detecting units 37 and 38, respectively, differ from each other. More specifically, the relative proportion of iron of the second magnetostrictive sub-member 3b is made smaller than that of the first magnetostrictive sub-member 3a. Thus, a curved line C21 is obtained instead of the curved line C2. The absolute value of the slope ΔC21 of the curved line C21 in the detection area (the area between −R to R) is made smaller than the absolute value of the slope ΔC2 (ΔC1) of the curved line C2 (C1) in the detection area. In this way, the detection sensitivity is decreased. Like the first exemplary embodiment, this structure can also make the detection sensitivity of the second detecting unit 38 different from the detection sensitivity of the first detecting unit 37 and make the detection sensitivity of the second detecting unit 38 smaller than the detection sensitivity of the first detecting unit 37. Therefore, like the first exemplary embodiment, the bending moments can be canceled out. Thus, the rotational moment of the rotation shaft (the steering axle) 21 can be accurately detected and, therefore, the steering feel can be improved.

Seventh Exemplary Embodiment

Figure 11:
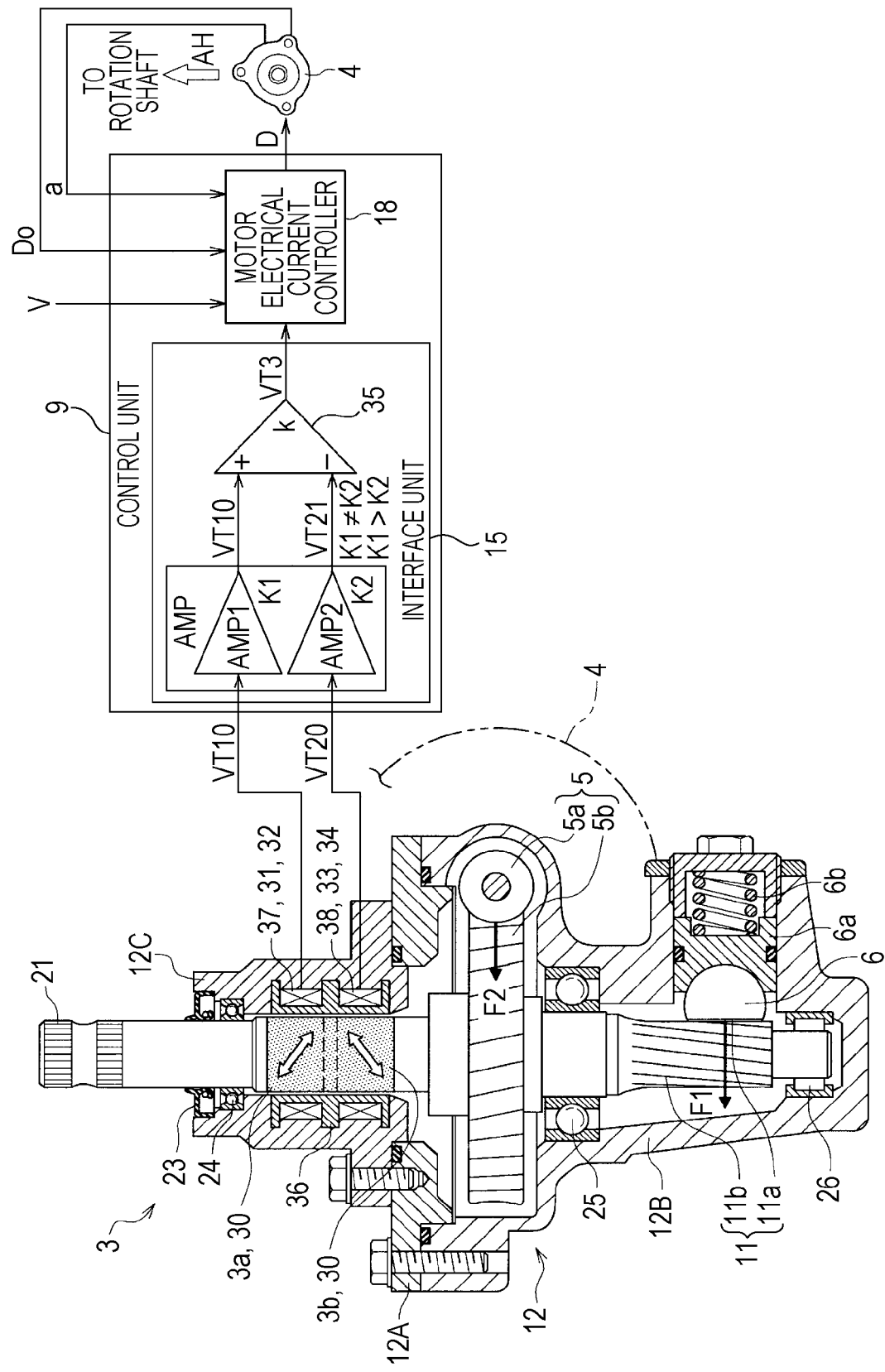
FIG. 11 illustrates an exemplary configuration of a magnetostrictive torque sensor and its vicinity in an electrically-assisted power steering apparatus according to a seventh exemplary embodiment of the present invention.

FIG. 11 illustrates the structure of a magnetostrictive torque sensor 3 of an electrically-assisted power steering apparatus and its vicinity according to a seventh exemplary embodiment of the present invention. The magnetostrictive torque sensor 3 according to the seventh exemplary embodiment differs from the magnetostrictive torque sensor 3 according to the first exemplary embodiment in that the coil turns N1 and N2 (N3 and N4) are made to be the same (N1=N2 and N3=N4), the detecting units 37 and 38 output torque detection voltages (output) VT10 and VT20, respectively, the torque detection voltages (the output) VT10 and VT20 are amplified by the amplifying sub-units AMP1 and AMP2 using different amplification factors K1 and K2 (K1≠K2), respectively, and torque detection voltages (outputs) VT10 and VT21 are output. More specifically, the amplification factor K2 of the amplifying sub-unit AMP2 of the second detecting unit 38 is made smaller than the amplification factor K1 of the amplifying sub-unit AMP1 of the first detecting unit 37 (K1>K2). Like the first exemplary embodiment, this structure can also make the detection sensitivity of the second detecting unit 38 different from the detection sensitivity of the first detecting unit 37 and make the detection sensitivity of the second detecting unit 38 smaller than the detection sensitivity of the first detecting unit 37. Therefore, like the first exemplary embodiment, the bending moments can be canceled out. Thus, the rotational moment of the rotation shaft (the steering axle) 21 can be accurately detected and, therefore, the steering feel can be improved. Note that any technique that changes the detection sensitivity can be employed in addition to the technique that changes the amplification factor. More specifically, the detection sensitivity may be changed by changing the circuit constants and software and, thus, changing the duty or the sampling timing of the driving frequency of the detecting unit 37 or 38.

Eighth Exemplary Embodiment

FIG. 12A illustrates the structure of a magnetostrictive torque sensor 3 (having one end that is open and the other end that is fixed) of an electrically-assisted power steering apparatus and its vicinity according to an eighth exemplary embodiment of the present invention. The magnetostrictive torque sensor 3 according to the eighth exemplary embodiment differs from the magnetostrictive torque sensor 3 according to the first exemplary embodiment in that the bearing 24 is removed, the top end of the rotation shaft (the steering axle) 21 is not rotationally supported, and the top end of the rotation shaft (the steering axle) 21 is an open end. However, in reality, the top end of the rotation shaft (the steering axle) 21 is not completely open. The steering wheel 2 is joined to the top end. For example, when the steering wheel 2 is strongly rotated as in the case where dry steering takes place during parking of a motor vehicle, a force G is exerted from the steering wheel 2 to the top end of the rotation shaft (the steering axle) 21 via the universal joints 13a and 13b.

Thus, rotational moment that causes the rotation shaft (the steering axle) 21 to rotate is generated by the force G. At the same time, bending moment is generated. As indicated by a thick bold line in FIG. 12B, the central axis of the rotation shaft (the steering axle) 21 is bent due to the bending moment. Note that although the force F1 and the force F2 are exerted on the rotation shaft (the steering axle) 21, the force F1 and the force F2 negligibly contribute to the magnitudes of the bending moments b1 and b2 for the detecting units 37 and 38 in the eighth exemplary embodiment and, therefore, the force F1 and the force F2 are not taken into account. Due to the force G, the portion of the rotation shaft (the steering axle) 21 above the bearing 25 is displaced so that the point at which the force G is applied serves as the point of load (the point of application), the side on which the force G is applied is stretched, and the other side is compressed.

FIG. 12C is a bending moment diagram illustrating the magnitudes of the bending moments b1 and b2 along the rotation shaft. In the bending moment diagram, the bending moment increases from the point of load of the force G to the bearing 25. Accordingly, the bending moment b1 of the first magnetostrictive sub-member 3a that is disposed so as to face the first detecting unit 37 (the first exciting circuit 31 and the first detection circuit 32) differs from the bending moment b2 of the second magnetostrictive sub-member 3b that is disposed so as to face the second detecting unit 38 (the second exciting circuit 33 and the second detection circuit 34) (b1≠b2). The bending moment b1 is smaller than the bending moment b2 (b1<b2). The magnitude relationship between the bending moment b1 and the bending moment b2 is the same as that in the first exemplary embodiment in which both ends of the rotation shaft (the steering axle) 21 are fixed. Therefore, even when one of the ends of the rotation shaft (the steering axle) 21 in the eighth exemplary embodiment is an open end and the other is a fixed end, the bending moments can be canceled out by employing the first exemplary embodiment and one of the second to seventh exemplary embodiments. In this way, the rotational moment of the rotation shaft (the steering axle) 21 can be accurately detected and, therefore, the steering feel can be improved.

According to an embodiment of the present invention, a magnetostrictive torque sensor includes a rotation shaft rotationally supported, a magnetostrictive member that is disposed on a surface of the rotation shaft and that changes an amount of deformation thereof in accordance with a magnitude of rotation torque applied to the rotation shaft and changes magnetic permeability, and at least two detection units disposed on the periphery of the rotation shaft, where each of the detection units detects a change in the magnetic permeability of the magnetostrictive member in the form of an electrical change. If amounts of change in deformation are the same throughout the magnetostrictive member, the detection units detect different amounts of electrical change.

In existing magnetostrictive torque sensors, the electrical change detected by a detection unit monotonically increases or decreases in accordance with an amount of change in deformation of a magnetostrictive member. However, the configuration according to the embodiment allows the detection units to detect different amounts of electrical change even when the amount of change in deformation of one of at least two magnetostrictive members is the same as the amount of change in deformation of the other magnetostrictive member. Inversely, the detection units can detect the same electrical changes for different changes in deformation caused by bending moments. Thus, the changes caused by the bending moments can be canceled out. Note that since, in order to detect deformation, the physical quantity of an amount of change in deformation is converted into the physical quantity of an electrical change, it can be considered that the magnetostrictive torque sensor includes at least two sensors that detect an amount of change in deformation in the form of an electrical change. Each of these two sensors that detect an amount of change in deformation is formed from a single detecting unit and an area of the magnetostrictive member that is magnetically coupled to the detecting unit. Since the sensors can detect different amounts of electrical change for the same amount of change in deformation. Therefore, it can be considered that the sensors have different detection sensitivities.

In addition, since the bending moment may be varied in accordance with the position along the rotation shaft at which a magnetostrictive member corresponding to the detection unit is disposed, the need for changing the diameter of the rotation shaft in accordance with the positions at which the magnetostrictive members are disposed can be eliminated. Therefore, the manufacturing cost of the rotation shaft can be reduced. Furthermore, since the magnetostrictive member can be disposed on a curved surface having a constant radius of curvature so that the property is constant, the coating cost can be also reduced. As a result, the magnetostrictive torque sensor can be manufactured at low cost.

Each of the detection units can include an exciting coil that generates a magnetic field in an area in which the magnetostrictive member is disposed and a detection coil that electrically detects an intensity of the magnetic field in accordance with the magnetic permeability, and the detection units can have different coil turns of the exciting coils or the detection coils.

The exciting coil can generate a magnetic field having an intensity in accordance with the number of turns of the coil, and the detection coil can change the ratio of a detected electrical amount to the intensity of the magnetic field. Accordingly, by making the numbers of turns of the excitation coil or the detection coil of one of the detection units different from that of another one of the detection units, the detection units can detect different amounts of electrical change when changes in deformation are the same throughout the magnetostrictive member. In addition, if, as described above, it is considered that the magnetostrictive torque sensor includes at least two sensors that detect an amount of change in deformation in the form of an electrical change, the detection sensitivities of the sensors can be easily made different from one another at low cost by making the numbers of turns of the excitation coils different from one another or making the numbers of turns of the detection coils different from one another.

An air gap can be formed between the magnetostrictive member and each of the detection units, and the sizes of the air gaps can differ from one another.

Each of the detection units detects a change in the magnetic permeability of the magnetostrictive member in the form of an electrical change. Thus, the detection unit is magnetically coupled to the magnetostrictive member. Each of the detection units forms a magnetic circuit together with the magnetostrictive member. Therefore, by making the size of the air gap formed between the magnetostrictive member and the detection unit different from the size for another detection unit, the detection units can detect different amounts of electrical change if changes in deformation are the same throughout the magnetostrictive member. In addition, if it is considered that the magnetostrictive torque sensor includes at least two sensors that detect an amount of change in deformation in the form of an electrical change, the detection sensitivities of the sensors can be easily made different from one another at low cost by making the sizes of the air gaps formed between the magnetostrictive member and the detection units different from one another.

Each of the detection units can include an exciting coil that has a winding wire wound around the rotation shaft in a circumferential direction of the rotation shaft and that generates a magnetic field in an area in which the magnetostrictive member is disposed and a detection coil that has a winding wire wound around the rotation shaft in a circumferential direction of the rotation shaft and that electrically detects an intensity of the electric field in accordance with the magnetic permeability, and among the detection units, the widths of the excitation coils in an axis direction of the rotation shaft can differ from one another or the widths of the detection coils in an axis direction of the rotation shaft differ from one another.

In this way, when changes in deformation are the same throughout the magnetostrictive member, the detection units can detect different amounts of electrical change. In addition, if, as described above, it is considered that the magnetostrictive torque sensor includes at least two sensors that detect an amount of change in deformation in the form of an electrical change, the detection sensitivities of the sensors can be easily made different from one another at low cost by making the widths of the coils of winding wires of detection coils different from one another.

The magnetostrictive member can be divided for each of the detection units, and the divided magnetostrictive member can be disposed on the surface of the rotation shaft so as to face a corresponding one of the detection units. The widths of the divided magnetostrictive members can differ from one another.

In this way, the detection units can also detect different amounts of electrical change if changes in deformation are the same throughout the magnetostrictive member. In addition, if, as described above, it is considered that the magnetostrictive torque sensor includes at least two sensors that detect an amount of change in deformation in the form of an electrical change, the detection sensitivities of the sensors can be easily made different from one another at low cost by making the widths of the divided magnetostrictive members different from one another.

Areas of the magnetostrictive member that face the detection units can be pre-deformed by different amounts. If the magnetostrictive member is deformed so that amounts of change in deformation are the same throughout the magnetostrictive member, amounts of change in the magnetic permeability in the areas can differ from each other.

The magnetic permeability of a magnetostrictive member varies in accordance with the amount of change in deformation. However, the magnetic permeability does not linearly vary throughout the deformation range. Accordingly, if the amount of change in deformation is offset by deforming the magnetostrictive member in advance, the detection units can detect different amounts of electrical change if the amounts of change in deformation are the same throughout the magnetostrictive member. In addition, if, as described above, it is considered that the magnetostrictive torque sensor includes at least two sensors that detect an amount of change in deformation in the form of an electrical change, the detection sensitivities of the sensors can be easily made different from one another at low cost by pre-deforming the areas of the magnetostrictive member facing the detection units by different amounts of deformation.

Areas of the magnetostrictive member that face the corresponding detection units can have different relative proportions of iron.

In this way, an amount of an electrical change detected by the detection unit can also be changed in accordance with an amount of change in deformation. Accordingly, if the amounts of change in deformation are the same throughout the magnetostrictive member, the detection units can detect different amounts of electrical change. In addition, if, as described above, it is considered that the magnetostrictive torque sensor includes at least two sensors that detect an amount of change in deformation in the form of an electrical change, the detection sensitivities of the sensors can be easily made different from one another at low cost by making the relative proportions of iron in the areas of the magnetostrictive member facing the detection units different from one another.

Each of the detection units can be connected to an amplifying unit that amplifies the electrical change, and the amplifying units can have different amplification factors used for amplifying the electrical changes for the detection units.

In this way, if the amounts of change in deformation are the same throughout the magnetostrictive member, the detection units can detect different amounts of electrical change. In addition, if, as described above, it is considered that the magnetostrictive torque sensor includes at least two sensors that detect an amount of change in deformation in the form of an electrical change, the detection sensitivities of the sensors can be easily made different from one another at low cost by making the amplification factors for the detection units different from one another.

According to an embodiment of the present invention, an electrically-assisted power steering apparatus is provided. The electrically-assisted power steering apparatus includes the magnetostrictive torque sensor according to the above-described embodiment, and the rotation shaft is used as a steering axle. The apparatus includes a rack and pinion gear mechanism configured to transfer rotation of the steering axle and a bearing disposed between the detection unit and the rack and pinion gear mechanism, where the bearing rotationally supports the steering axle. The detection units are disposed so as to be shifted from each other in an axis direction of the rotation shaft, and if amounts of change in deformation are the same throughout the magnetostrictive member, one of the detection units that is nearer to the bearing detects the electrical change that is smaller than that detected by one of the detection units that is further away from the bearing.

In order to reliably transfer the rotation of the rotation shaft, the rack and pinion gear mechanism is urged onto the rotation shaft. The bearings support the rotation shaft. In addition, the rotation shaft on the opposite side of the bearing from the detection unit is supported by a steering wheel and another bearing. Thus, bending moment that causes the central axis of the rotation shaft to bend is applied to the rotation shaft. The magnitude of the bending moment varies in accordance with the position in the axis direction of the rotation shaft. More specifically, the bending moment decreases with a distance from the bearing disposed between the detection unit and the rack and pinion gear mechanism in a direction toward the detection unit. The magnitude of the bending moment is larger at a point nearer to the bearing than at a point further away from the bearing. Thus, if the amounts of change in deformation are the same throughout the magnetostrictive member, the detection units can cancel out the bending moments by detecting, using the detection unit that is nearer to the bearing, an electrical change that is smaller than an electrical change detected by the detection unit further away from the bearing.

According to an embodiment of the present invention, a magnetostrictive torque sensor that can be manufactured at low cost and that can cancel out amounts of change corresponding to bending moments can be provided. In addition, an electrically-assisted power steering apparatus including such a magnetostrictive torque sensor can be provided.

Obviously, numerous modifications and variations of the present invention are possible in light of the above teachings. It is therefore to be understood that within the scope of the appended claims, the invention may be practiced otherwise than as specifically described herein.

What is claimed is:

1. An electrically-assisted power steering apparatus comprising:
    a magnetostrictive torque sensor comprising:
        a rotation shaft rotationally supported, the rotation shaft serving as a steering axle;
        a magnetostrictive member disposed on a surface of the rotation shaft and being deformable in accordance with a magnitude of rotation torque applied to the rotation shaft to change magnetic permeability; and
        a plurality of detectors disposed on a periphery of the rotation shaft each of the detectors being configured to detect a change in magnetic permeability of the magnetostrictive member in a form of an electrical change, the detectors being configured to detect different amounts of electrical change from one another if amounts of change in deformation are same throughout the magnetostrictive member;
    a rack and pinion gear mechanism to transfer rotation of the steering axle; and
    a bearing disposed between the detector and the rack and pinion gear mechanism, the bearing rotatably supporting the steering axle,
    wherein the detectors are disposed to be shifted from each other in an axis direction of the rotation shaft,
    wherein the at least two detectors includes a first detector and a second detector, the second detector being disposed nearer to the bearing than the first detector, and
    wherein if amounts of change in deformation are the same throughout the magnetostrictive member, the second detector detects an electrical change that is smaller than an electrical change detected by the first detector.

2. The electrically-assisted power steering apparatus according to claim 1,
    wherein each of the detectors includes an exciting coil to generate a magnetic field in an area in which the magnetostrictive member is disposed and a detection coil to electrically detect an intensity of the magnetic field in accordance with the magnetic permeability, and
    wherein one group of the exciting coils and the detection coils have different coil turns from one another.

3. The electrically-assisted power steering apparatus according to claim 1,
    wherein an air gap is formed between the magnetostrictive member and each of the detectors, and
    wherein the sizes of the air gaps differ from one another.

4. The electrically-assisted power steering apparatus according to claim 1,
    wherein each of the detectors includes an exciting coil and a detection coil, the exciting coil having a winding wire wound around the rotation shaft in a circumferential direction of the rotation shaft, the exciting coil being to generate a magnetic field in an area in which the magnetostrictive member is disposed, the detection coil having a winding wire wound around the rotation shaft in a circumferential direction of the rotation shaft, the detection coil being to electrically detect an intensity of the magnetic field in accordance with the magnetic permeability, and
    wherein among the detectors, the widths of the exciting coils in an axis direction of the rotation shaft differ from one another or the widths of the detection coils in an axis direction of the rotation shaft differ from one another.

5. The electrically-assisted power steering apparatus according to claim 1,
    wherein the magnetostrictive member is divided for each of the detectors into a first magnetostrictive member and a second magnetostrictive member, and
    wherein the first magnetostrictive member is disposed on the surface of the rotation shaft to face one of the detectors,
    wherein the second magnetostrictive member is disposed on the surface of the rotation shaft to face another of the detectors, and
    wherein widths of the first and second magnetostrictive members differ from one another.

6. The electrically-assisted power steering apparatus according to claim 1,
    wherein facing areas of the magnetostrictive member that face the detectors are pre-deformed by different amounts, and
    wherein if the magnetostrictive member is deformed so that amounts of change in deformation amounts are the same as one another throughout the magnetostrictive member, changes in the magnetic permeability in the facing areas differ from each other.

7. The electrically-assisted power steering apparatus according to claim 1, wherein areas of the magnetostrictive member that face the detectors have different relative proportions of iron from one another.

8. The electrically-assisted power steering apparatus according to claim 1,
wherein each of the detectors is connected to an amplifying device configured to amplify the electrical change, and
wherein the amplifying devices have different amplification factors from one another, the amplification factors being used for amplifying the electrical changes detected by the detectors.

9. The electrically-assisted power steering apparatus according to claim 1,
wherein the magnetostrictive member is divided for each of the detectors into a first magnetostrictive member and a second magnetostrictive member, and
wherein each of the first and second magnetostrictive members and the second magnetostrictive member are deformed in advance by a predetermined amount in opposite circumferential directions around the rotation shaft to have magnetic anisotropies in the opposite circumferential directions.

* * * * *